United States Patent
Takakuwa et al.

(10) Patent No.: US 8,492,057 B2
(45) Date of Patent: Jul. 23, 2013

(54) COLORED CURABLE COMPOSITION, COLOR FILTER, AND METHOD FOR PRODUCING COLOR FILTER

(75) Inventors: Hideki Takakuwa, Shizuoka-ken (JP); Hiroshi Taguchi, Shizuoka-ken (JP); Kaoru Aoyagi, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 408 days.

(21) Appl. No.: 12/724,479

(22) Filed: Mar. 16, 2010

(65) Prior Publication Data

US 2010/0239965 A1   Sep. 23, 2010

(30) Foreign Application Priority Data

Mar. 17, 2009   (JP) .................................. 2009-065053

(51) Int. Cl.
*G02B 5/20* (2006.01)
(52) U.S. Cl.
USPC ............................. 430/7; 430/280.1; 257/440
(58) Field of Classification Search
None
See application file for complete search history.

(56) References Cited

U.S. PATENT DOCUMENTS

| 2007/0203255 A1* | 8/2007 | Sasaki | 522/49 |
| 2008/0160432 A1* | 7/2008 | Byon et al. | 430/7 |
| 2008/0268354 A1* | 10/2008 | Suzuki | 430/7 |
| 2009/0053626 A1* | 2/2009 | Takakuwa et al. | 430/7 |
| 2009/0186202 A1* | 7/2009 | Shibatani et al. | 428/195.1 |
| 2010/0022700 A1* | 1/2010 | Shibatani et al. | 524/517 |

FOREIGN PATENT DOCUMENTS

| JP | 2-199403 A | 8/1990 |
| JP | 2006-317893 A | 11/2006 |
| JP | 2007-284592 A | 11/2007 |
| JP | 2007-320986 A | 12/2007 |
| JP | 2008-247454 | 10/2008 |
| JP | 2009-053652 | 3/2009 |
| JP | 2009-116316 | 5/2009 |

OTHER PUBLICATIONS

English language translation of the following: Office action dated Mar. 12, 2013 from the JPO in a Japanese patent application corresponding to the instant patent application. This office action translation is submitted now in order to supplement the understanding of patent document JPA2009-53652, JPA2008-247454 and JPA2009-116316 which are in the office action and are being disclosed in the instant Information Disclosure Statement.

* cited by examiner

*Primary Examiner* — John A. McPherson

(74) *Attorney, Agent, or Firm* — SOLARIS Intellectual Property Group, PLLC

(57) ABSTRACT

A colored curable composition for a solid-state image pickup device, including a polyhalogenated zinc phthalocyanine pigment, a photopolymerization initiator, a polymerizable compound, and an epoxy compound.

20 Claims, No Drawings

COLORED CURABLE COMPOSITION, COLOR FILTER, AND METHOD FOR PRODUCING COLOR FILTER

CROSS-REFERENCE TO RELATED APPLICATION

This application claims priority under 35 USC 119 from Japanese Patent Application No. 2009-065053 filed on Mar. 17, 2009, the disclosure of which is incorporated by reference herein.

BACKGROUND OF THE INVENTION

1. Field of the Invention

The invention relates to a colored curable composition suitable for making a color filter for a solid-state image pickup device such as a CCD or CMOS, a color filter obtained using the colored curable composition, and a method for producing the color filter.

2. Description of the Related Art

Color filters are essential components of solid-state image pickup devices. As a composition for a color filter, a negative type curable composition including a pigment dispersion liquid, an alkali soluble resin, a photopolymerizable monomer, and a photopolymerization initiator has been proposed (see, for example, Japanese Patent Application Laid-Open (JP-A) No. 2-199403). In recent years, color filters for solid-state image pickup devices are required to provide higher image quality, and to form fine patterns while containing a high concentration of coloring agents. Use of dyes in place of pigments as coloring agents has been proposed (see JP-A No. 2006-317893), but dyes have problems with respect to fastness. Therefore, at present, pigments are mainly used as the coloring agents.

It is known that a polyhalogenated zinc phthalocyanine having high chroma is used as a green coloring agent suitable for a solid-state image pickup device (see JP-A Nos. 2007-284592 and 2007-320986). However, it has been found that when a green pattern is formed using the polyhalogenated zinc phthalocyanine, and red and blue patterns are further formed, needle crystals occur in the green pattern.

SUMMARY OF THE INVENTION

According to an aspect of the invention, there is provided a colored curable composition for a solid-state image pickup device, comprising a polyhalogenated zinc phthalocyanine pigment, a photopolymerization initiator, a polymerizable compound, and an epoxy compound.

DETAILED DESCRIPTION OF THE INVENTION

The colored curable composition, the color filter formed using the colored curable composition, and the method for making the same according to the invention are further described below in detail.

[Colored Curable Composition for Solid-State Image Pickup Device]

The colored curable composition of the invention for a solid-state image pickup device contains at least a polyhalogenated zinc phthalocyanine pigment as a coloring agent, and further contains a photopolymerization initiator and a polymerizable compound. The photopolymerization initiator is preferably an oxime initiator.

The polyhalogenated zinc phthalocyanine pigment as an essential component of the colored curable composition of the invention is described below.

<Polyhalogenated Zinc Phthalocyanine Pigment>

The polyhalogenated zinc phthalocyanine pigment has a structure in which at least 2 but at most 16 chlorine and/or bromine atoms in total are bonded to one phthalocyanine molecule (structure). The hue of the polyhalogenated zinc phthalocyanine pigment changes from blue to green as the number of the chlorine and/or bromine atoms bonded to the molecule are increased. In order that the polyhalogenated zinc phthalocyanine pigment may be green, the pigment has preferably 8 or more bromine atoms as halogen atoms bonded to the molecule. The pigment has particularly preferably 12 or more bromine atoms, so that a further yellowish green color having high lightness may be formed. The number of bromine atoms is preferably greater than the number of chlorine atoms in the pigment, so that a more yellowish green color may be formed.

Examples of polyhalogenated zinc phthalocyanines include the following compound represented by the formula (F).

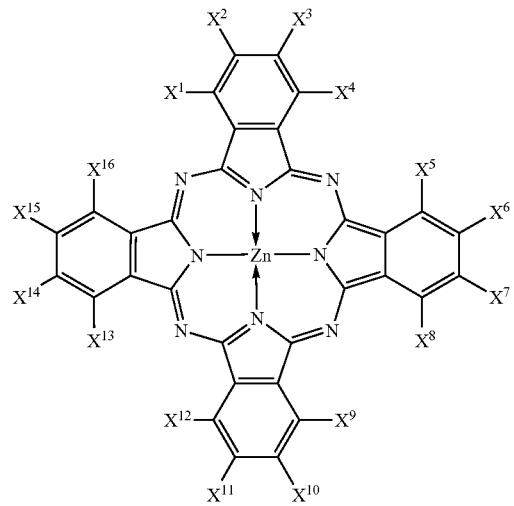

Formula (F)

In the formula (F), $X^1$ to $X^{16}$ each independently represent a chlorine atom, a bromine atom, or a hydrogen atom, and at least two of $X^1$ to $X^{16}$ is a chlorine atom or a bromine atom.

In particular, 8 or more of $X^1$ to $X^{16}$ are preferably substituted with bromine atoms, thereby forming a high lightness green color suitable for the use in green pixels (color pattern) of a color filter. The number of substitutions with bromine atoms is more preferably from 10 to 14.

The polyhalogenated zinc phthalocyanine pigment useful in the invention is preferably a polyhalogenated zinc phthalocyanine having an average primary particle diameter of 0.01 to 0.30 μm. The average primary particle diameter of the pigment in the invention is measured by the method described below.

The average primary particle diameter in the invention is determined as follows: using a transmission electron microscope, particles in the visual field are imaged, and the longer diameter (major axis) and the shorter diameter (minor axis) of 100 primary particles of the halogenated zinc phthalocyanine pigment forming aggregates are measured and averaged in the two-dimensional image, and the average of the averaged major and minor axes is recorded as the average primary particle diameter.

In the colored curable composition of the invention, the polyhalogenated zinc phthalocyanine pigment (A) may be used alone or in combination of two or more thereof. For example, plural polyhalogenated zinc phthalocyanine pigments having specific halogen atom compositions, which are different from each other in the substitution number of halogen atoms selected from bromine and chlorine atoms in the formula (F), may be contained at a specific ratio.

Preferred exemplary embodiments include the combination of a polyhalogenated zinc phthalocyanine pigment containing 16 bromine atoms, and a polyhalogenated zinc phthalocyanine pigment containing 15 bromine atoms and one chlorine atom. The ratio between them is preferably from 80:20 to 100:0.

The average composition of the polyhalogenated zinc phthalocyanine pigment (A) contained in the curable composition of the invention is determined by mass analysis based on mass spectroscopy and by halogen content analysis based on flask combustion-ion chromatography. In the same manner, the mole percentages of the individual specific polyhalogenated zinc phthalocyanine pigments in the polyhalogenated zinc phthalocyanine pigment composition are readily determined from the result of mass analysis.

The polyhalogenated zinc phthalocyanine pigment suitable for the use in the invention may be produced by the method described in JP-A No. 2007-320986 or 2008-19383.

The method for converting a polyhalogenated zinc phthalocyanine into a pigment form is not particularly limited. For example, a polyhalogenated zinc phthalocyanine is converted into a pigment form concurrently with the dispersion into a dispersion medium. However, in comparison with solvent treatment including heating a halogenated metal phthalocyanine under stirring in a large amount of organic solvent, solvent salt milling treatment is more preferred thereby readily suppressing crystal growth and forming pigment particles having large specific surface areas.

The solvent salt milling treatment includes kneading and milling a polyhalogenated zinc phthalocyanine immediately after synthesis, or a polyhalogenated zinc phthalocyanine after milling but before conversion into a pigment form (coarse pigment), with an inorganic salt and an organic solvent.

When the solvent salt milling treatment is carried out, the coarse pigment is more preferred than the product immediately after synthesis. More specifically, the coarse pigment, an inorganic salt, and an organic solvent, which will not dissolve the inorganic salt used for milling, are charged into a kneader, and kneaded and milled. The kneader may be, for example, a kneader or a mixing muller.

The inorganic salt used for the solvent salt milling treatment is preferably a water-soluble inorganic salt, and preferred examples of the inorganic salt include sodium chloride, potassium chloride, and sodium sulfate. The average particle diameter of the inorganic salt is more preferably from 0.5 μm to 50 μm. The inorganic salt having a predetermined particle diameter suitable for the salt milling treatment is readily obtained by finely grinding the inorganic salt.

In the invention, the polyhalogenated zinc phthalocyanine pigment preferably has an average primary particle diameter of 0.01 μm to 0.10 μm from the viewpoint of being suitable for formation of a color pattern of the color filter for a solid-state image pickup device. The conditions of the salt milling treatment may be determined so as to achieve the particle diameter in the above-described range.

In order to obtain the polyhalogenated zinc phthalocyanine having the particle diameter preferred in the invention, the amount of the inorganic salt is preferably larger with respect to that of the coarse pigment during the solvent salt milling treatment. More specifically, the amount of the inorganic salt is preferably from 5 to 20 parts by mass, and more preferably from 7 to 15 parts by mass with respect to 1 part by mass of the coarse pigment.

The organic solvent used for the salt milling treatment is preferably a solvent in which the inorganic salt is insoluble, and prevents the crystal growth.

Preferred examples of the organic solvent include water-soluble organic solvents such as diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, and dipropylene glycol monomethyl ether.

The amount of the organic solvent is not particularly limited, but preferably from 0.01 to 5 parts by mass with respect to 1 part by mass of the coarse pigment.

When producing the polyhalogenated zinc phthalocyanine pigment composition, the coarse pigment alone may be subjected to the solvent salt milling treatment, or a combination of the polyhalogenated zinc phthalocyanine coarse pigment and a phthalocyanine derivative may be subjected to the solvent salt milling treatment.

The phthalocyanine derivative is useful for improving the dispersibility of the pigment. The derivative may be added during the solvent salt milling treatment, during the synthesis of the coarse pigment, or after the conversion into a pigment form. From the viewpoint of further suppressing the viscosity increase during dispersion of the pigment, it is preferred that the derivative be added before the conversion process into a pigment form, such as the solvent salt milling treatment. The addition of the phthalocyanine derivative improves the viscosity properties of the colored curable composition for a color filter and the dispersion stability of the pigment.

The phthalocyanine derivative used in the curable composition of the invention may be any known one, and is preferably the phthalocyanine pigment derivative represented by the following formula (f-1) or (f-2). The phthalocyanine derivative used herein is preferably derived from a polyhalogenated zinc phthalocyanine, or a zinc phthalocyanine which is the raw material of the polyhalogenated zinc phthalocyanine. As will be described later, the addition amount of the phthalocyanine derivative is small, and thus the derivative may be a polyhalogenated copper phthalocyanine derivative or a copper phthalocyanine derivative, which will also improve the viscosity properties and pigment dispersibility.

  (f-1)

  (f-2)

In the formulae (f-1) and (f-2), P represents an unsubstituted or halogen-substituted phthalocyanine residue having or not having a central metal from which m or n hydrogen atoms have been removed; Y represents a monovalent substituent group selected from a group consisting of primary to tertiary amino groups, carboxylic acid groups, and sulfonic acid groups, and the substituent group may be in the form of a salt with a base or a metal; A represents a divalent linking group, and Z represents a primary amino group, a secondary amino group, or a nitrogen-containing heterocycle residue from which one hydrogen atom on a nitrogen atom has been removed; m represents an integer of 1 to 4, and n represents an integer of 1 to 4.

In the formulae (f-1) and (f-2), the central metal of the phthalocyanine residue represented by P is preferably Zn.

Examples of the primary and secondary amino groups in Y include a monomethylamino group, a dimethylamino group, and a diethylamino group. Examples of the base or metal forming a salt with the carboxylic acid group or the sulfonic acid group include organic bases such as ammonia, dimethylamine, diethylamine, and triethylamine, and metals such as potassium, sodium, calcium, strontium, and aluminum. Examples of the divalent linking group represented by A include alkylene groups having 1 to 3 carbon atoms, and divalent linking groups such as $-CO_2-$, $-SO_2-$, and $-SO_2NH(CH_2)-$. Examples of Z include a phthalimido group, a monoalkylamino group, and a dialkylamino group.

The amount of the phthalocyanine derivative added to the coarse pigment during the preparation of the coarse pigment and/or during solvent salt milling is usually from 0.01 to 0.3 parts by mass with respect to 1 part by mass of the coarse pigment. When the phthalocyanine derivative is added during the preparation of the coarse pigment and/or during the solvent salt milling treatment, the total amount of the coarse pigment and the phthalocyanine derivative is regarded as the used amount of the coarse pigment, and the used amount of the inorganic salt with respect to the total amount is preferably selected from the above-described range.

The temperature during the solvent salt milling is preferably from 30 to 150° C., and more preferably from 80 to 100° C. The period of the solvent salt milling is preferably from 5 to 20 hours, and more preferably from 8 to 18 hours.

In this manner, a mixture composed mainly of a halogenated zinc phthalocyanine pigment composition having an average primary particle diameter of 0.01 to 0.10 μm, an inorganic salt, and an organic solvent is obtained. The organic solvent and the inorganic salt are removed from the mixture, and, as necessary, the solid may be subjected to washing, filtration, drying, grinding, and any other process, thereby obtaining powder of the polyhalogenated zinc phthalocyanine pigment. The powder containing the polyhalogenated zinc phthalocyanine pigment and optionally the pigment derivative is hereinafter referred to as a polyhalogenated zinc phthalocyanine pigment composition.

The polyhalogenated zinc phthalocyanine pigment may be washed with water or hot water. The number of washing may be 1 to 5. The mixture containing a water-soluble inorganic salt and a water-soluble organic solvent may be washed with water thereby readily removing the organic solvent and the inorganic salt. As necessary, the pigment may be washed with an acid, alkali, or solvent without changing the crystal condition.

After the above-described filtration and washing treatment, the pigment may be dried in a batch or continuous manner under heating at 80° C. to 120° C. by, for example, a heating source mounted on a dryer, thereby dehydrating and/or desolvating the pigment. The dryer may be, for example, a box dryer, a band dryer, or a spray-dryer. Spray drying is particularly preferred because the pigment is readily dispersed in the preparation of a paste. The grinding process after drying is carried out not for increasing the specific surface area and decreasing the average primary particle diameter, but for disassembling the pigment lumped during, for example, drying with a box dryer or a band dryer, thereby powdering the pigment. The grinding process may be achieved by, for example, a mortar, a hammer mill, a disc mill, a pin mill, or a jet mill. In this manner, a dry powder composed mainly of the polyhalogenated zinc phthalocyanine pigment composition may be obtained.

In the polyhalogenated zinc phthalocyanine pigment composition, the average primary particle diameter of the pigment is adjusted to particularly preferably from 0.01 μm to 0.10 μm, thereby relatively weakening the agglomeration of the pigment, and achieving good dispersibility into a synthetic resin and the like to be colored. Accordingly, the pigment composition is suitable for the cured composition of the invention.

The polyhalogenated zinc phthalocyanine pigment composition is preferred because it is readily dispersed into a curable composition for a color filter, decreases the light shielding effect at 365 nm, which is a wavelength often used for curing the curable composition for a color filter, will not cause the deterioration of the photocuring sensitivity of the resist, and scarcely causes thinning of the film or pattern collapse during development. A green pixel for a color filter achieving a high sharpness and a high lightness, which is required in recent years, is readily obtained.

The primary particle of the polyhalogenated zinc phthalocyanine pigment composition is preferably has an aspect ratio of 1 to 3 thereby improving the viscosity properties and flowability in various applications. In order to determine the aspect ratio, firstly, particles in the visual field are imaged with a transmission electron microscope or scanning electron microscope in the same manner as in the measurement of the average primary particle diameter. Thereafter, the longer diameter (major axis) and the shorter diameter (minor axis) of 50 primary particles forming aggregates are measured and averaged in the two-dimensional image, and these averages are used to calculate the aspect ratio.

In the preparation of the polyhalogenated zinc phthalocyanine pigment composition according to the invention, for example, a substance reducing light transmittance at a wavelength of 725 nm may be added at any time during the production of the above-described polyhalogenated zinc phthalocyanine pigment, or an existing polyhalogenated zinc phthalocyanine pigment having a high light transmittance at a wavelength of 725 nm may be mixed with a substance reducing light transmittance at a wavelength of 725 nm.

The substance reducing light transmittance at a wavelength of 725 nm preferably presents no problem for the applications of the polyhalogenated zinc phthalocyanine pigment composition. Examples of the active component of the substance include a surfactant.

For example, the surfactant may be added to the polyhalogenated zinc phthalocyanine pigment composition during the preparation of the coarse pigment and/or during and/or after the solvent salt milling treatment.

The surfactant used herein may be, for example, an ampholytic surfactant and/or an anionic surfactant. The surfactant preferably has so good adsorptivity for the polyhalogenated zinc phthalocyanine pigment that as much portion as possible (preferably the whole amount) of the active component adsorbs to and covers the pigment. In particular, betaine type ampholytic surfactants such as carboxybetaine, amide betaine, sulfobetaine, hydroxysulfobetaine, amide sulfobetaine, and phosphobetaine type surfactants are preferred, because they reduces light transmittance at 425 nm as well as at 725 nm, achieve higher color purity when used for the pattern formation in green pixels of a color filter, thereby providing a color filter achieving a broader RGB color region.

The amount of the surfactant that may be added to the polyhalogenated zinc phthalocyanine pigment composition is not particularly limited, but normally, in terms of mass, from 0.1 to 10 parts, preferably from 0.5 to 5 parts, and more preferably from 1 to 3 parts with respect to 100 parts of the polyhalogenated zinc phthalocyanine pigment composition.

The method for adding the surfactant is not particularly limited. In a preferred method, the pigment composition after the solvent salt milling treatment is dispersed in water, the surfactant is added in an appropriate amount within the above-described range, and the mixture is stirred under heating at room temperature to 140° C. for 30 to 300 minutes. When the method is used, in the same manner as the above-described procedure, filtration, washing, drying, and grinding are carried out, thus obtaining a dry powder composed mainly of the polyhalogenated zinc phthalocyanine pigment composition of the invention. The amount (so-called yield) of the surfactant as the active component contained in the polyhalogenated zinc phthalocyanine pigment composition may be determined from, for example, the amount of the surfactant extracted from the pigment composition using a solvent, or the amount of the surfactant in the filtrate with respect to the charged amount of the surfactant.

(Other Pigments)

According to the intended use, the curable composition of the invention may further contain other pigments in addition to the polyhalogenated zinc phthalocyanine pigment.

For example, it is preferred that the polyhalogenated zinc phthalocyanine pigment, which is a green pigment, be mixed with a yellow pigment for color control thereby exhibiting intended characteristics.

Examples of the yellow pigment used herein include yellow organic pigments such as C. I. Pigment Yellow 83, 110, 138, 139, 150, 180, and 185. Among them, C. I. Pigment Yellow 139 is preferred thereby achieving a uniform coating thickness.

The ratio of the yellow pigment to the polyhalogenated zinc phthalocyanine pigment composition of the invention may be from 10 to 100 parts by mass, more preferably from 30 to 70 parts by weight, and particularly preferably from 50 to 60 parts by mass with respect to 100 parts by mass of the polyhalogenated zinc phthalocyanine pigment composition.

The polyhalogenated zinc phthalocyanine pigment composition of the invention, even when combined with a yellow pigment for color control, allows the formation of green pixels for the color filter with less turbidity, and higher color purity, coloring power, and lightness in comparison with prior art combinations of pigments of two or more different colors for color control.

The addition of the polyhalogenated zinc phthalocyanine pigment to the curable composition is preferably achieved by previously preparing a pigment dispersion liquid, and then mixing the pigment dispersion liquid with the other components of the curable composition, thereby facilitating the dispersion of the pigment.

The pigment dispersion liquid is normally prepared from the polyhalogenated zinc phthalocyanine pigment composition, an organic solvent, and, as necessary, a dispersant.

Preferable examples of the organic solvent include esters such as ethyl acetate, n-butyl acetate, isobutyl acetate, amyl formate, isoamyl acetate, isobutyl acetate, butyl propionate, isopropyl butyrate, ethyl butyrate, butyl butyrate, alkyl esters, methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate, ethyl ethoxyacetate, 3-oxypropionic acid alkyl esters such as methyl 3-oxypropionate and ethyl 3-oxy propanoate, methyl 3-methoxypropionate, ethyl 3-methoxypropanoate, methyl 3-ethoxypropionate, ethyl 3-ethoxypropionate, methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanoate, ethyl 2-oxobutanoate; ethers such as diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether, propylene glycol methyl ether, propylene glycol methyl ether acetate, propylene glycol ethyl ether acetate, propylene glycol propyl ether acetate; ketones such as methyl ethyl ketone, cyclohexanone, 2-heptanone, 3-heptanone; aromatic hydrocarbons such as toluene, and xylene.

Among them, methyl 3-ethoxypropionate, ethyl 3-ethoxypropionate, ethyl cellosolve acetate, ethyl lactate, diethylene glycol dimethyl ether, butyl acetate, methyl 3-methoxypropionate, 2-heptanone, cyclohexanone, ethyl carbitol acetate, butyl carbitol acetate, propylene glycol methyl ether, propylene glycol methyl ether acetate and the like are more preferable. Among them, ethyl lactate, cyclohexanone, and propylene glycol methyl ether acetate are most preferable.

<Dispersant>

In order to improve dispersibility of the pigment, the curable composition of the invention preferably contains a dispersant. The dispersant is preferably previously mixed with the pigment to make a pigment dispersion liquid.

Examples of the dispersant (pigment dispersant) useful in the invention include polymeric dispersants [for example, polyamide amines and salts thereof, polycarboxylic acid and salts thereof, high molecular weight unsaturated acid esters, modified polyurethanes, modified polyesters, modified poly(meth)acrylates, (meta)acrylic copolymers, and naphthalene sulfonic acid formalin condensates], polyoxyethylene alkyl phosphate esters, polyoxyethylene alkylamine, alkanolamine, and pigment derivatives.

On the basis of the structure, the polymeric dispersants may be further classified into linear polymers, terminal modified polymers, graft polymers, and block polymers.

The polymeric dispersant adsorbs to the pigment surface to prevent the reaggregation of the pigment. Examples of the preferred structure for achieving this include terminal modified polymers, graft polymers, and block polymers having sites to be anchored at the pigment surface. The pigment derivative modifies the pigment surface thereby promoting the adsorption of the polymeric dispersant.

The pigment dispersant useful in the invention may be a commercial product. Specific examples of commercial dispersants include Disperbyk-101 (polyamide amine phosphate), 107 (carboxylate ester), 110 (acid group-containing copolymer), 130 (polyamide), 161, 162, 163, 164, 165, 166, 170 (polymeric copolymers), and BYK-P104, P105 (high molecular weight unsaturated polycarboxylic acids) manufactured by BYK Chemie; EFKA 4047, 4050, 4010, 4165 (polyurethanes), EFKA4330, 4340 (block copolymers), 4400, 4402 (modified polyacrylates), 5010 (polyester amide), 5765 (high molecular weight polycarboxylate), 6220 (fatty acid polyester), 6745 (phthalocyanine derivative), and 6750 (azo pigment derivative) manufactured by EFKA; AJISPAR PB821, PB822 manufactured by Ajinomoto Fine-Techno Co., Inc.; FLOWLEN TG-710 (urethane oligomer), POLYFLOW No. 50E, No. 300 (acrylic copolymers) manufactured by Kyoeisha Chemical Co., Ltd.; DISPARLON KS-860, 873SN, 874, #2150 (aliphatic polycarboxylic acids), #7004 (polyether ester), DA-703-50, DA-705, DA-725 manufactured by Kusumoto Chemicals, Ltd.; DEMOL RN, N (naphthalene sulfonic acid formalin polycondensates), MS, C, SN-B (aromatic sulfonic acid formalin polycondensates), HOMOGENOL L-18 (polymeric polycarboxylic acid), EMULGEN 920, 930, 935, 985 (polyoxyethylene nonyl phenyl ether), ACETAMIN 86 (stearylamine acetate) manufactured by Kao Corporation; SOLSPERSE 5000 (phthalocyanine derivative), 22000 (azo pigment derivative), 13240 (polyester amine), 3000, 17000, 27000 (polymers having functional moieties at terminals), 24000, 28000, 32000, 38500 (graft polymers) manufactured by The Lubrizol Corporation; and NIKKOL T106 (polyoxyethylene sorbitan monooleate), and MYS-IEX (polyoxyethylene monostearate) manufactured by Nikko Chemicals Co., Ltd.

These dispersants may be used alone or in combination of two or more thereof. In the invention, the combination of a pigment derivative and a polymeric dispersant is particularly preferred.

In the invention, the content of the dispersant is preferably from 1 to 100% by mass, more preferably from 3 to 100% by mass, and even more preferably from 5 to 80% by mass with respect to the pigment.

More specifically, the used amount of a polymeric dispersant is preferably from 5 to 100% by mass, and more preferably from 10 to 80% by mass with respect to the pigment. The used amount of a pigment derivative is preferably from 1 to 30% by mass, more preferably from 3 to 20% by mass, and particularly preferably from 5 to 15% by mass with respect to the pigment.

Since it is important for a green color filter to limit the transmittance at 400 to 450 nm and at 620 to 700 nm in a minimum film thickness, the content of the coloring agent in the colored curable composition of the invention is preferably higher. However, if the coloring agent content is too high, the exposed areas may be insufficiently cured.

Therefore, the total amount of the pigment is preferably from 40 to 80% by mass, more preferably from 43.0 to 75% by mass, and even more preferably from 44.0 to 70% by mass with respect to the total solid content of the curable composition.

<Pigment Dispersing Resin>

In the colored curable composition of the invention, it is preferred that the pigment be dispersed by the above-described dispersant as well as a pigment dispersing resin, thereby improving the stability over time of the pigment through prevention of aggregation.

The pigment dispersing resin may be any commonly known linear organic polymer. In order to allow aqueous development or weak alkaline aqueous development, linear organic polymers soluble or swellable in water or weak alkaline water are preferred. Linear organic polymers serve as film-forming components, and are selected and used according to the kind of the aqueous, weak alkaline aqueous, or organic solvent developer. For example, the use of a water-soluble organic polymer allows aqueous development.

Specifically, various compounds may be used, and examples include cationic surfactants such as organosiloxane polymer KP341 (manufactured by Shin-Etsu Chemical Co., Ltd.), (meth)acrylic acid (co)polymer POLYFLOW No. 75, No. 90, No. 95 (manufactured by Kyoeisha Chemical Co., Ltd.), and W001 (purchased from Yusho Co., Ltd.); nonionic surfactants such as polyoxyethylene lauryl ether, polyoxyethylene stearyl ether, polyoxyethylene oleyl ether, polyoxyethylene octyl phenyl ether, polyoxyethylene nonyl phenyl ether, polyethylene glycol dilaurate, polyethylene glycol distearate, and sorbitan fatty acid ester; anionic surfactants such as W004, W005, W017 (purchased from Yusho Co., Ltd.); polymeric dispersants such as EFKA-46, EFKA-47, EFKA-47EA, EFKA polymer 100, EFKA polymer 400, EFKA polymer 401, EFKA polymer 450 (manufactured by Ciba Specialty Chemicals), DISPERSE AID 6, DISPERSE AID 8, DISPERSE AID 15, and DISPERSE AID 9100 (manufactured by San Nopco Limited); various SOLSPERSE dispersants such as SOLSPERSE 3000, 5000, 9000, 12000, 13240, 13940, 17000, 24000, 26000, and 28000 (manufactured by The Lubrizol Corporation); ADEKA PLURONIC L31, F38, L42, L44, L61, L64, F68, L72, P95, F77, P84, F87, P94, L101, P103, F108, L121, P-123 (manufactured by Asahi Denka Company Limited), ISONET S-20 (manufactured by Sanyo Chemical Industries, Ltd.), and Disperbyk 101, 103, 106, 108, 109, 111, 112, 116, 130, 140, 142, 162, 163, 164, 166, 167, 170, 171, 174, 176, 180, 182, 2000, 2001, 2050, 2150 (manufactured by BYK-Chemie). Other examples include oligomers and polymers having polar groups at the ends or side chains of the molecules, such as acrylic copolymers.

The weight average molecular weight of the pigment dispersing resin useful in the invention is preferably 5,000 or more, and more preferably from 10000 to 300000, and the number average molecular weight is preferably 1,000 or more, and more preferably from 2,000 to 250000. The polydispersity (weight average molecular weight/number average molecular weight) is preferably 1 or more, and more preferably from 1.1 to 10.

The pigment dispersing resin may be a random, block, or graft polymer.

It is most important that the pigment dispersing resin useful in the invention will not impair the curability in the exposed areas. In order to achieve this, the pigment dispersing resin is most preferably a resin containing a structural unit selected from the structural units represented by the following formulae (1) to (3).

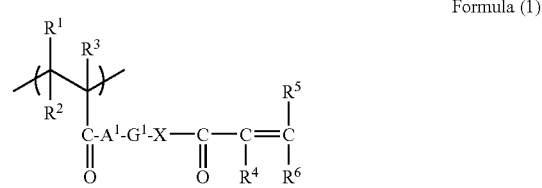

Formula (1)

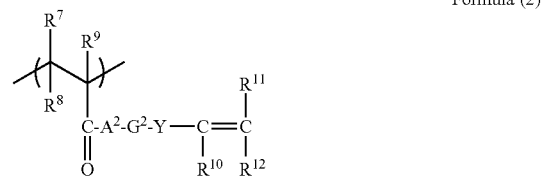

Formula (2)

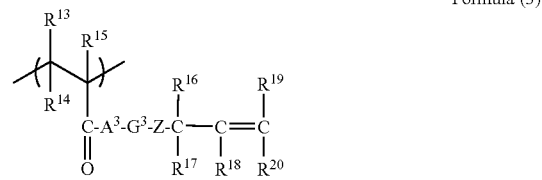

Formula (3)

In the formulae (1) to (3), $A^1$, $A^2$, and $A^3$ each independently represent an oxygen atom, a sulfur atom, or $-N(R^{21})-$, and $R^{21}$ represents an optionally substituted alkyl group; $G^1$, $G^2$, and $G^3$ each independently represent a divalent organic group; X and Z each independently represent an oxygen atom, a sulfur atom, or —N($R^{22}$)—, and $R^{22}$ represents an optionally substituted alkyl group; Y represents an oxygen atom, a sulfur atom, an optionally substituted phenylene group, or —N($R^{23}$)—, and $R^{23}$ represents an optionally substituted alkyl group; and $R^1$ to $R^{20}$ each independently represent a monovalent substituent group.

These resins are described in detail in JP-A No. 2003-262958, paragraphs [0006] to [0061], and the details of the method for producing the resins and preferred embodiments of the resins are described in JP-A No. 2003-262958, paragraphs [0028] to [0033] or JP-A No. 2003-335814. These polymers are also suitable as the dispersing resins in the invention.

Preferred examples of the resin obtained by the synthetic method of JP-A No. 2003-335814 include polymer compounds described in JP-A No. 2003-335814, and specific examples thereof include (i) polyvinyl compounds, (ii) polyurethane compounds, (iii) polyurea compounds, (iv) poly (urethane-urea) compounds, (V) polyester compounds, (vi) polyamide compounds, (vii) acetal modified polyvinyl alcohol compounds, and specific compounds obtained according to the above-described descriptions. These resins are also suitable as the dispersing resins.

In the invention, the pigment dispersing resin preferably has an acid value of 5 to 200 mgKOH/g, more preferably 7 to 150 mgKOH/g, and even more preferably 10 to 100 mgKOH/g. If the acid value is more than 200 mgKOH/g, pattern peeling tends to occur during development. On the other hand, if the acid value is less than 5 mgKOH/g, alkali developability may markedly deteriorate.

In the invention, the acid value may be calculated from, for example, the average content of the acid groups in the resin molecules. The content of the monomer units having an acid group in the resin may be changed thereby obtaining a resin having an intended acid value.

In the invention, specific examples of the pigment dispersing resin include the following polymer compounds P-1 to P-5.

| Polymer compound | | | | Acid value (mg KOH/g) | Mw |
|---|---|---|---|---|---|
| P-1 | | | | 54 | 15000 |
| P-2 | | | | 49 | 36000 |
| P-3 | | | | 34 | 24000 |
| P-4 | | | | 44 | 13000 |
| P-5 | | | | 43 | 10000 |

In the invention, the mass average molecular weight of the resin is preferably from 5,000 to 300,000, more preferably from 6,000 to 250,000, and even more preferably from 7,500 to 200,000, from the viewpoint of preventing pattern peeling during development and achieving good developability.

The mass average molecular weight of the resin may be determined, for example, by GPC.

<Photopolymerization Initiator>

The colored curable composition of the invention contains a photopolymerization initiator.

The photopolymerization initiator in the invention is a compound which is decomposed by light and initiates and promotes the polymerization of a polymerizable compound, and preferably has an absorption in the wavelength range of 300 to 500 nm. The photopolymerization initiator may be used alone or in combination of two or more thereof.

Examples of the photopolymerization initiator include organic halogenated compounds, oxydiazole compounds, carbonyl compounds, ketal compounds, benzoin compounds, acridine compounds, organic peroxide compounds, azo compounds, coumarin compounds, azide compounds, metallocene compounds, hexaarylbiimidazol compounds, organic boric acid compounds, disulfonic acid compounds, oxime ester compounds, onium salt compounds, and acylphosphine (oxide) compounds.

These photopolymerization initiators are described in detail in JP-A No. 2008-32803, paragraphs [0058] to [0078]. The compounds described therein are also useful in the invention.

From the viewpoint of exposure sensitivity, the photopolymerization initiator used in the invention is preferably a compound selected from the group consisting of trihalomethyltriazine compounds, benzyl dimethyl ketal compounds, α-hydroxyketone compounds, α-aminoketone compounds, acyl phosphine compounds, phosphine oxide compounds, metallocene compounds, oxime compounds, biimidazole compounds, onium compounds, benzothiazole compounds, benzophenone compounds, acetophenone compounds and derivatives thereof, cyclopentadiene-benzene-iron complexes and salts thereof, halomethyloxadiazole compounds, and 3-aryl substituted coumarin compounds.

Among them, trihalomethyltriazine compounds, α-aminoketone compounds, acylphosphine compounds, phosphine oxide compounds, oxime compounds, biimidazole compounds, onium compounds, benzophenone compounds, and acetophenone compounds are more preferred, and at least one compound selected from the group consisting of trihalomethyltriazine compounds, α-aminoketone compounds, oxime compounds, biimidazole compounds, and benzophenone compounds is even more preferred. Oxime compounds are most preferred.

Examples of the oxime initiator suitable for the colored curable composition of the invention include the compound represented by the formula (I).

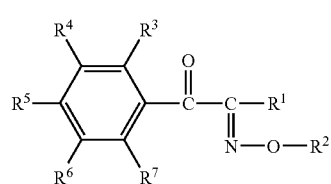

In the formula (I), $R^1$ represents an optionally substituted alkyl or aryl group; $R^2$ represents an optionally substituted acyl group, an optionally substituted alkyl group, an optionally substituted aryl group, an optionally substituted alkenyl group, or an optionally substituted alkynyl group; $R^3$, $R^4$, $R^5$, $R^6$, and $R^7$ each independently represent a hydrogen atom or a monovalent organic group; $R^3$, $R^4$, $R^5$, $R^6$, and $R^7$ may be bonded to each other to form a five- or six-membered ring.

Examples of the substituent group introduced to the alkyl, aryl, and acyl groups include a methyl group, an ethyl group, an n-propyl group, an n-butyl group, an i-propyl group, a t-butyl group, a chloro group, and a bromo group.

$R^1$ is preferably an alkyl group having 1 to 12 carbon atoms or a 4-($C_{1-4}$ alkylthio)phenyl group. $R^2$ is preferably an acyl group such as an acetyl group.

When $R^3$, $R^4$, $R^5$, $R^6$ and $R^7$ each independently represent a monovalent organic group, the organic group is preferably a methyl group, an ethyl group, a methoxy group, an ethoxy group, a phenoxy group, or a thiophenoxy group, and particularly preferably a phenoxy group or a thiophenoxy group.

$R^3$, $R^4$, $R^6$, and $R^7$ are preferably hydrogen atoms. $R^5$ is preferably a group represented by $-SR^8$, and more preferably a group represented by the following formula.

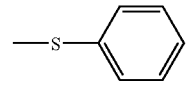

Among the oxime initiators represented by the formula (I), examples of other preferred initiators include the compound represented by the formula (4).

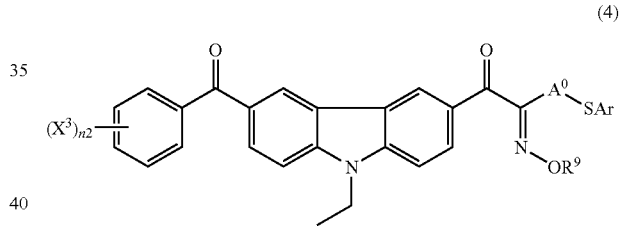

In the formula (4), $R^9$ and $X^3$ each independently represent a monovalent substituent group; n2 represents an integer of 1 to 5; when n2 represents an integer of 2 to 5, plural $X^3$s may be the same or different from each other; $A^0$ represents a divalent organic group; and Ar represents an aryl group.

In the formula (4), the monovalent organic group represented by $R^9$ is preferably an acyl group, such as an acetyl group, a propionyl group, a benzoyl group, or a toluoyl group, from the viewpoint of achieving high sensitivity.

In the formula (4), the monovalent organic group represented by $X^3$ is, for example, a methyl group, an ethyl group, an n-propyl group, an n-butyl group, an i-propyl group, a t-butyl group, a methoxy group, or an ethoxy group.

In the formula (4), the divalent organic group represented by $A^0$ is preferably alkylene having 1 to 12 carbon atoms, cyclohexylene, or alkynylene.

In the formula (4), the aryl group represented by Ar is preferably an aryl group having 6 to 30 carbon atoms, and the aryl group may be substituted. Examples of the substituent group introduced to the aryl group include a methyl group, an ethyl group, an n-propyl group, an n-butyl group, an i-propyl group, a t-butyl group, a methoxy group, and an ethoxy group.

Among them, Ar is preferably a substituted or unsubstituted phenyl group, form the viewpoint of improving sensitivity and preventing coloration by heating and over time.

In the invention, the oxime compound suitable as the photopolymerization initiator may be the compound described in JP-A No. 2000-80068, and examples thereof include 1-(4-phenylsulfanyl-phenyl)-butane-1,2-dione 2-oxime-O-benzoate, 1-(4-phenylsulfanyl-phenyl)-octane-1,2-dione 2-oxime-O-benzoate, 1-(4-phenylsulfanyl-phenyl)-octane-1-one oxime-O-acetate, 1-(4-phenylsulfanyl-phenyl)-butane-1-one oxime-O-acetate. Among them, 1-(4-phenylsulfanyl-phenyl)-octane-1,2-dione 2-oxime-O-benzoate is particularly preferred.

In the curable composition of the invention, the content of the photopolymerization initiator is preferably from 0.1 to 50% by mass, more preferably from 0.5 to 30% by mass, and particularly preferably from 1 to 20% by mass with respect to the total solid content of the colored curable composition. When the content is within the above-described range, good sensitivity and pattern formation are achieved.

<Sensitizer>

The curable composition of the invention may contain a sensitizer for the purpose of improving the radical generation efficiency of the radical initiator, and shifting the photosensitive wavelength to a longer wavelength. The sensitizer useful in the invention preferably sensitizes the above-described photopolymerization initiator through an electron or energy transfer mechanism.

Examples of the sensitizer useful in the invention include the below-described compounds having an absorption wavelength in a range from 300 nm to 450 nm.

Preferred examples of the sensitizer include the following compounds having an absorption wavelength in a range from 330 nm to 450 nm.

Examples of preferred sensitizers include polynuclear aromatic compounds such as phenanthrene, anthracene, pyrene, perylene, triphenylene, and 9,10-dialkoxyanthracene; xanthenes such as fluorescein, eosine, erythrosine, Rhodamine B, and rose bengal; thiazines such as thioxanthones, cyanines, melocyanines, phthalocyanines, thionin, methylene blue, and toluidine blue; aromatic ketone compounds such as acridines, anthraquinones, squaryliums, coumarins, phenothiazines, phenazines, styrylbenzenes, azo compounds, diphenylmethane, triphenyl methane, distyrylbenzenes, carbazoles, porphyrin, spiro compounds, quinacridone, indigo, styryl, pyrylium compounds, pyrromethene compounds, pyrazolotriazole compounds, benzothiazole compounds, barbituric acid derivatives, thiobarbituric acid derivatives, acetophenone, benzophenone, and Michler's ketone; and heterocycle compounds such as N-aryl oxazolidinone.

More preferred examples of the sensitizer include the compounds described in JP-A No. 2008-214394, paragraphs [0085] to [0098]. These compounds are also suitable for the use in the invention.

The sensitizer may be used alone or in combination of two or more thereof.

The content of the sensitizer in the curable composition of the invention is preferably from 0.1 to 20% by mass, and more preferably from 0.5 to 15% by mass in terms of the solid content, from the viewpoints of the light absorption efficiency at the depth and the initiation decomposition efficiency.

<Polymerizable Compound>

The colored curable composition of the invention for a solid-state image pickup device contains a polymerizable compound. The polymerizable compound may be any compound as long as it has in the molecule thereof at least one unsaturated double bond, and is polymerized and cured by a radical initiator. Typical examples of the polymerizable compound include radically polymerizable monomers.

The radically polymerizable monomer is further described below. The radically polymerizable monomer preferably has a boiling point of 100° C. or higher under normal pressure, and has at least one addition-polymerizable ethylenically unsaturated group.

Examples of the compound having at least one addition-polymerizable ethylenically unsaturated group and a boiling point of 100° C. or higher under normal pressure include monofunctional acrylates and methacrylates such as polyethylene glycol mono(meth)acrylate, polypropylene glycol mono(meth)acrylate, and phenoxyethyl(meth)acrylate; polyethylene glycol di(meth)acrylate, trimethylolethane tri(meth)acrylate, neopentyl glycol di(meth)acrylate, pentaerythritol tri(meth)acrylate, pentaerythritol tetra(meth)acrylate, dipentaerythritol hexa(meth)acrylate, hexanediol (meth)acrylate, trimethylolpropane tri(acryloyloxypropyl)ether, tri(acryloyloxyethyl)isocyanurate, those obtained by the addition of ethylene oxide or propylene oxide to a polyfunctional alcohol such as glycerol or trimethylolethane followed by the (meth)acrylation thereof, those obtained by the poly(meth)acrylation of pentaerythritol or dipentaerythritol, urethane acrylates described in Japanese Patent Application Publication (JP-B) Nos. 48-41708, 50-6034, and JP-A No. 51-37193, polyester acrylates described in JP-A No. 48-64183, JP-B Nos. 49-43191 and 52-30490, and epoxy acrylates produced through the reaction between epoxy resins and (meth)acrylic acid.

The photocurable monomers and oligomers described in Nihon Secchaku Kyokaishi Vol. 20, No. 7, pp. 300 to 308 may also be used.

The compounds obtained by the addition of ethylene oxide or propylene oxide to a polyfunctional alcohol such as those described above followed by the (meth)acrylation thereof, which are described in JP-A No. 10-62986 as the compounds represented by the formulae (1) and (2) together with the specific examples thereof, may also be used.

Among them, dipentaerythritol penta(meth)acrylate, dipentaerythritol hexa(meth)acrylate, and the structures thereof wherein acryloyl groups are bound via an ethylene glycol or propylene glycol residue are preferred. Oligomers of these compounds may be also used. In particular, monomers having five or more ethylene oxide structures are more preferred, and monomers having seven or more ethylene oxide structures are particularly preferred.

Urethane acrylates described in JP-B No. 48-41708, JP-A No. 51-37193, JP-B Nos. 2-32293 and 2-16765, and urethane compounds having ethylene oxide skeletons described in JP-B Nos. 58-49860, 56-17654, 62-39417, and 62-39418 are also preferred. Further, by the use of the addition-polymerizable compounds having an amino or sulfide structure in the molecule thereof described in JP-A Nos. 63-277653, 63-260909, and 1-105238, the resultant photopolymerizable composition exhibits a very high photosensitive speed. Examples of commercial products include urethane oligomers UAS-10, UAB-140 (manufactured by Sanyo-Kokusaku Pulp Co., Ltd.), UA-7200 (manufactured by Shin-nakamura Chemical Co., Ltd.), DPHA-40H (manufactured by Nippon Kayaku Co., Ltd.), UA-306H, UA-306T, UA-306I, AH-600, T-600, and AI-600 (manufactured by Kyoeisha Chemical Co., Ltd.).

In addition, ethylenically unsaturated compounds having acid groups are also preferred. Examples of commercial products include TO-756 (carboxyl group containing trifunctional acrylate) and TO-1382 (carboxyl group containing pentafunctional acrylate) manufactured by Toagosei Co., Ltd.

The content of the polymerizable compound in the colored curable composition is preferably from 3.0% by mass or more but 50.0% by mass or less with respect to the total mass of the composition, from the viewpoint of reducing residues of unexposed areas. For the same reason, the content is more preferably 4.0% by mass or more but 25.0% by mass or less, and most preferably 5.0% by mass or more but 20.0% by mass or less.

<Epoxy Compound>

The colored curable composition of the invention for a solid-state image pickup device essentially contains an epoxy compound. The epoxy compound in the invention is not particularly limited as long as it has at least one oxirane ring (epoxy group) in the molecule thereof, and may be a monomer, oligomer, or polymer (epoxy resin). Among them, epoxy resins having 10 or more epoxy groups in the molecule thereof are preferred.

Examples of the epoxy compound suitable for the use in the invention include epoxy resins. Epoxy resins generically refer to compounds having two or more oxirane rings (epoxy groups) in the molecule thereof. Examples of the epoxy resin include, as described in "Epoxy Jushi Saikin no Shinpo (Shokodo Co., Ltd., Hiroshi Kakiuchi, 1990)", bisphenol A epoxy resins, bisphenol F epoxy resins, novolac epoxy resins, brominated epoxy resins, glycidylamine epoxy resins, epoxy resins having a naphthalene skeleton, epoxy resins having a bisphenol skeleton, trifunctional epoxy resins, tetrafunctional epoxy resins, imide group-containing epoxy resins, and alicyclic epoxy resins.

The epoxy resin useful in the invention may be a commercial product. Specific examples include the following compounds.

Examples of the bisphenol A epoxy resin include EPICLON860, 1050, 1055, 2050, 3050, 4050, 7050, HM-091, HM-101 (manufactured by DIC Corporation), ADEKA RESIN EP-4100, EP-4100G, EP-4100E, EP-4100W, EP-4100TX, EP-4300E, EP-4340, EP-4200, EP-4400, EP-4500A, EP-4510, EP-4520, EP-45205, EP-4520TX, and EP-4530 (manufactured by Asahi Denka Company Limited).

Examples of the bisphenol F epoxy resin include EPICLON830, 830-S, 835, EXA-830CRP, EXA-830LVP, EXA-835LV (manufactured by DIC Corporation), ADEKA RESIN EP-4901, EP-4901E, and EP-4950 (manufactured by Asahi Denka Company Limited).

Examples of the novolac epoxy resin include EPICLON N-660, N-665, N-670, N-673, N-680, N-690, N-695, N-665-EXP, N-672-EXP, N-655-EXP-S, N-662-EXP-S, N-665-EXP-S, N-670-EXP-S, N-685-EXP-S, N-673-80M, N-680-75M, N-690-75M, N-740, N-770, N-775, N-740-80M, N-770-70M, N-865, and N-865-80M (manufactured by DIC Corporation).

Examples of the alicyclic epoxy resin include CELLOXIDE 2021P, 2081, 2083, 2085, 3000, and EHPE3150 (manufactured by Daicel Chemical Industries, Ltd.).

Examples of the trifunctional epoxy resin include EPOLEAD GT300 (manufactured by Daicel Chemical Industries, Ltd.).

Examples of the tetrafunctional epoxy resin include EPOLEAD GT400 (manufactured by Daicel Chemical Industries, Ltd.).

Other examples of the epoxy resin useful in the invention include resins obtained through the polymerization of a compound having (meth)acryl and epoxy groups, such as a glycidyl methacrylate homopolymer.

Among these epoxy resins, polyfunctional epoxy resins are particularly preferred, thereby markedly preventing the formation of needle matter. More specifically, epoxy compounds having 5 to 50 epoxy groups in the molecule thereof are preferred, and epoxy compounds having 10 to 25 epoxy groups in the molecule thereof are more preferred.

Specific examples of the polyfunctional epoxy resin include various novolac epoxy resins (the number of oxetane rings in the molecule: 3 to 30), EHPE-3150 (the number of oxetane rings in the molecule: about 15, manufactured by Daicel Chemical Industries, Ltd.), and resins obtained through the polymerization of a compound having (meth) acryl and epoxy groups (the number of oxetane rings in the molecule: 3 to 50).

The molecular weight of the epoxy resin is preferably 1500 or more but 100,000 or less, more preferably from 1750 or more but 10,000 or less, and even more preferably 2000 or more but 7000 or less.

The content of the epoxy compound in the colored curable composition is preferably 1% by mass or more but 15% by mass or less. When the addition amount of the epoxy compound is 1% by mass or more, occurrence of needle matter is sufficiently prevented. In addition, when the addition amount of the epoxy resin is 15% by mass or less, thickening over time is prevented, and the colored curable composition readily forms a uniform layer. The addition amount of the epoxy resin is more preferably 2% by mass or more buy 10% by mass or less, and particularly preferably 3% by mass or more but 7.5% by mass or less.

<Binder Polymer>

The curable composition of the invention may further contain, as necessary, a binder polymer for improving the film properties. The binder is preferably a linear organic polymer. As the linear organic polymer, those known in the art may be used. In order to enable water development or weak alkali water development, a linear organic polymer that is soluble or swellable in water or weak alkali water is preferably selected. The linear organic polymer may be selected and used in accordance with the function as a film forming agent and the kind of the water, weak alkali water or organic solvent developer. For example, when a water soluble organic polymer is used, water development may be carried out. The resins described above as a pigment dispersing resin may also be preferably used as a binder polymer.

In the production of the binder polymer, for example, a known radical polymerization method may be used. The polymerization conditions in the radical polymerization method for producing an alkali soluble resin, such as the temperature, the pressure, the kind and the amount of the radical initiator, and the kind of the solvent, may be easily set by a person skilled in the art, and the conditions may also be experimentally determined.

As the linear organic polymer, a polymer having a carboxylic acid group in a side chain is preferable. A methacrylic acid copolymer, an acrylic acid copolymer, an itaconic acid copolymer, a crotonic acid copolymer, a maleic acid copolymer, a partially esterified maleic acid copolymer, an acidic cellulose derivative having a carboxylic acid group in a side chain, and a polymer obtained by adding an acid anhydride to a polymer having a hydroxyl group are more preferabale. A copolymer of (meth)acrylic acid and another monomer copolymerizable with (meth)acrylic acid is particularly preferable. Examples of another monomer copolymerizable with (meth)acrylic acid include an alkyl(meth)acrylate, an aryl (meth)acrylate, and a vinyl compound. Examples of the alkyl (meth)acrylate and the aryl (meth)acrylate include methyl (meth)acrylate, ethyl(meth)acrylate, propyl(meth)acrylate, butyl(meth)acrylate, isobutyl(meth)acrylate, pentyl(meth) acrylate, hexyl(meth)acrylate, octyl(meth)acrylate, phenyl (meth)acrylate, benzyl(meth)acrylate, tolyl(meth)acrylate, naphthyl(meth)acrylate, and cyclohexyl(meth)acrylate.

Examples of the vinyl compound include styrene, α-methyl styrene, vinyltoluene, glycidyl methacrylate, acrylonitrile, vinyl acetate, N-vinylpyrrolidone, tetrahydrofurfuryl methacrylate, a polystyrene macromonomer, and a polymethyl methacrylate macromonomer.

Among them, a benzyl(meth)acrylate/(meth)acrylic acid copolymer and a multi-component copolymer of benzyl (meth)acrylate/(meth)acrylic acid/another monomer are particularly preferable. Other examples include a copolymer of 2-hydroxyethyl methacrylate, and copolymers described in JP-A No. 7-140654, such as 2-hydroxypropyl (meth)acrylate/ polystyrene macromonomer/benzyl methacrylate/methacrylic acid copolymer, 2-hydroxy-3-phenoxypropyl acrylate/polymethyl methacrylate macromonomer/benzyl methacrylate/methacrylic acid copolymer, 2-hydroxyethyl methacrylate/polystyrene macromonomer/methyl methacrylate/methacrylic acid copolymer, and 2-hydroxyethyl methacrylate/polystyrene macromonomer/benzyl methacrylate/ methacrylic acid copolymer.

In order to improve the curing efficiency of the colored curable composition of the invention, an alkali soluble resin having a polymerizable group may be used. For example, a polymer having a polymerizable group such as an allyl group, a (meth)acryl group, allyloxyalkyl group or the like in a side chain is useful. Preferable examples of the polymer having a polymerizable group include an urethane-modified and polymerizable double bond-containing acryl resin obtained by the reaction of a carboxyl group-containing acryl resin and a (meth)acryloyl group-containing compound in which one unreacted isocyanate group has been left by the preliminary reaction of the isocyanate groups and OH groups, an unsaturated group-containing acryl resin obtained by the reaction of a carboxyl group-containing acryl resin and a compound containing an epoxy group and a polymerizable double bond in the molecule, an acid pendant type epoxy acrylate resin, a polymerizable double bond-containing acryl resin obtained by the reaction of an OH group-containing acryl resin and a dibasic acid anhydride having a polymerizable double bond, a resin obtained by the reaction of an OH group-containing acryl resin and a compound having an isocyanate group and a polymerizable group, and a resin obtained by a basic treatment of a resin having in a side chain thereof an ester group having at the α or β position thereof an elimination group such as a halogen atom or a sulfonate group as described in JP-A Nos. 2002-229207, 2003-335814 and the like.

Other preferable examples of the binder polymer in the invention include a polymer containing as a polymerization component a structural unit derived from a compound represented by the following formula (ED) (hereinafter also referred to as "ether dimer").

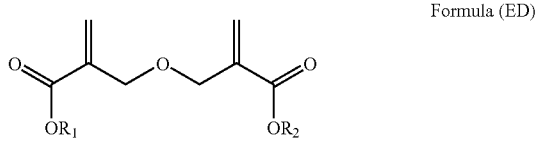

Formula (ED)

In the formula (ED), $R_1$ and $R_2$ each independently represent a hydrogen atom or a hydrocarbon group having 1-25 carbon atoms which may have a substituent group.

When a binder polymer containing a structural unit derived from the ether dimer is used, the colored curable composition of the invention may have the advantage of being capable of forming a cured coating film excellent in heat resistance as well as transparency.

Examples of the hydrocarbon group having 1-25 carbon atoms which may have a substituent group, represented by $R_1$ and $R_2$ in the formula (ED), are not particularly limited and include a linear or branched alkyl group such as a methyl, ethyl, n-propyl, isopropyl, n-butyl, isobutyl, t-butyl, t-amyl, stearyl, lauryl or 2-ethylhexyl group; an aryl group such as a phenyl group; an alicyclic group such as a cyclohexyl, t-butylcyclohexyl, dicyclopentadienyl, tricyclodecanyl, isobornyl, adamantyl or 2-methyl-2-adamantyl group; an alkoxy-substituted alkyl group such as a 1-methoxyethyl or 1-ethoxyethyl group; and an alkyl group which is substituted with an aryl group such as a benzyl group. Among them, a substituent group of primary or secondary carbon, which is hardly eliminated by acid or heat, such as a methyl, ethyl, cyclohexyl or benzyl group, is particularly preferable in view of heat resistance.

Specific examples of the ether dimer include dimethyl-2,2'-[oxybis(methylene)]bis-2-propenoate, diethyl-2,2'-[oxybis(methylene)]bis-2-propenoate, di(n-propyl)-2,2'-[oxybis(methylene)]bis-2-propenoate, di(isopropyl)-2,2'-[oxybis(methylene)]bis-2-propenoate, di(n-butyl)-2,2'-[oxybis(methylene)]bis-2-propenoate, di(isobutyl)-2,2'-[oxybis(methylene)]bis-2-propenoate, di(t-butyl)-2,2'-[oxybis(methylene)]bis-2-propenoate, di(t-amyl)-2,2'-[oxybis(methylene)]bis-2-propenoate, di(stearyl)-2,2'-[oxybis(methylene)]bis-2-propenoate, di(lauryl)-2,2'-[oxybis(methylene)]bis-2-propenoate, di(2-ethylhexyl)-2,2'-[oxybis(methylene)]bis-2-propenoate, di(1-methoxyethyl)-2,2'-[oxybis(methylene)]bis-2-propenoate, di(1-ethoxyethyl)-2,2'-[oxybis(methylene)]bis-2-propenoate, dibenzyl-2,2'-[oxybis(methylene)]bis-2-propenoate, diphehyl-2,2'-[oxybis(methylene)]bis-2-propenoate, dicyclohexyl-2,2'-[oxybis(methylene)]bis-2-propenoate, di(t-butylcyclohexyl)-2,2'-[oxybis(methylene)]bis-2-propenoate, di(dicyclopentadienyl)-2,2'-[oxybis(methylene)]bis-2-propenoate, di(tricyclodecanyl)-2,2'-[oxybis(methylene)]bis-2-propenoate, di(isobornyl)-2,2'-[oxybis(methylene)]bis-2-propenoate, di(adamantyl)-2,2'-[oxybis(methylene)]bis-2-propenoate, and di(2-methyl-2-adamantyl)-2,2'-[oxybis(methylene)]bis-2-propenoate.

Among them, dimethyl-2,2'-[oxybis(methylene)]bis-2-propenoate, diethyl-2,2'-[oxybis(methylene)]bis-2-propenoate, dicyclohexyl-2,2'-[oxybis(methylene)]bis-2-propenoate, and dibenzyl-2,2'-[oxybis(methylene)]bis-2-propenoate are particularly preferable. Only one or two or more kinds of structural units derived from the ether dimers may be contained in the binder polymer.

The binder polymer containing a structural unit derived from a compound represented by the formula (ED) may be a copolymer further containing a structural unit derived from a monomer other than a structural unit derived from a compound represented by the formula (ED). Examples of the monomer, the structural unit derived from which may further be contained in the binder polymer, include the above-described monomers which are listed as a component of the binder polymer, and the monomer may be appropriately used so as not to impair the property of the ether dimer.

The acid value of the binder polymer (alkali soluble resin) in the invention is preferably 30 to 150 mg KOH/g and more preferably 35 to 120 mg KOH/g. The weight average molecular weight (Mw) of the binder polymer is preferably 2,000 to 50,000 and more preferably 3,000 to 30,000.

These binder polymers may be random polymers, block polymers, graft polymers or the like.

The content of the binder polymer in the total solid content of the colored curable composition is preferably 1 to 40% by mass, more preferably 3 to 30% by mass, and further preferably 4 to 20% by mass, <Surfactant>

The colore curable composition of the invention may contain various surfactants from the viewpoint of improving the coatability. Examples of the surfactants which may be used in the invention include various surfactants such as a fluorine-containing surfactant, a nonionic surfactant, a cationic surfactant, an anionic surfactant, and a silicone-based surfactant.

In particular, when the colored curable composition of the invention contains a fluorine-containing surfactant, the liquid properties (in particular, fluidity) of the composition prepared as a coating liquid is improved, thereby enabling improvement in the uniformity of the coating thickness and the liquid saving.

That is, when a colored curable composition containing a fluorine-containing surfactant is used as a coating liquid to form a film, due to decrease in the surface tension between the surface to be coated and the coating liquid, the wettability on the surface to be coated is improved, so that the coatability on the surface to be coated is improved. As a result, even when a thin film of several micrometers is formed with a small amount of the liquid, a film with uniform thickness may be suitably formed.

The fluorine content in the fluorine-containing surfactant is preferably 3% by mass to 40% by mass, more preferably 5% by mass to 30% by mass, and particularly preferably 7% by mass to 25% by mass. A fluorine-containing surfactant having a fluorine content in this range is effective in the uniformity of the coating film thickness and the liquid saving, and has good solubility in the colored curable composition.

Examples of the fluorine-containing surfactant include MEGAFAC F171, F172, F173, F176, F177, F141, F142, F143, F144, R30, F437, F479, F482, F780 and F781 (manufactured by DIC Corporation), FLUORAD FC430, FC431 and FC171 (manufactured by Sumitomo 3M Limited), SURFLON S-382, SC-101, SC-103, SC-104, SC-105, SC1068, SC-381, SC-383, 5393 and KH-40 (manufactured by Asahi Glass Co., Ltd.), and CW-1 (manufactured by Zeneca).

Examples of the nonionic surfactant include polyoxyethylene lauryl ether, polyoxyethylene stearyl ether, polyoxyethylene oleyl ether, polyoxyethylene octyl phenyl ether, polyoxyethylene nonyl phenyl ether, polyethylene glycol dilaurate, polyethylene glycol disteatate, and sorbitan fatty acid ester (such as PLURONIC L10, L31, L61, L62, 10R5, 1782 and 25R2, and TETRONIC 304, 701, 704, 901, 904 and 150R1, manufactured by BASF).

Examples of the cationic surfactant include a phthalocyanine derivative (trade name: EFKA-745, manufactured by Morishita & Co., Ltd.), an organosiloxane polymer (trade name: KP341, manufactured by Shin-Etsu Chemical Co., Ltd.), a (meth)acrylic acid based (co)polymer (trade names: POLYFLOW No. 75, No. 90, No. 95, manufactured by Kyoeisha Chemical Co., Ltd.), and W001 (trade name, manufactured by Yusho Co., Ltd.).

Examples of the anionic surfactant include W004, W005 and W017 (trade names, manufactured by Yusho Co., Ltd.).

Examples of the silicone-based surfactant include "TORAY SILICONE DC3PA", "TORAY SILICONE SH7PA", "TORAY SILICONE DC11PA", "TORAY SILICONE SH21PA", "TORAY SILICONE SH28PA", "TORAY SILICONE SH29PA", "TORAY SILICONE SH30PA" and "TORAY SILICONE SH8400" (trade names, manufactured by Dow Corning Toray Co., Ltd.), "TSF-4440", "TSF-4300", "TSF-4445", "TSF-444(4)(5)(6)(7)6", "TSF-44 60" and "TSF-4452" (trade names, manufactured by Momentive Performance Materials Inc.), "KP341" (trade name, manufactured by Shin-Etsu Chemical Co., Ltd.), and "BYK323" and "BYK330" (trade names, manufactured by BYK Chemie).

Only one surfactant may be used, or two or more surfactants may be used in combination.

<Co-Sensitizer>

The curable composition of the invention preferably further contains a co-sensitizer. In the invention, the co-sensitizer further improves the sensitivity of the sensitizing dye and initiator to active radiation, or prevents inhibition of polymerization of the polymerizable compound caused by oxygen.

Examples of the co-sensitizer include amines such as the compounds described in M. R. Sander et al, "Journal of Polymer Society", vol. 10, p. 3173 (1972), JP-B No. 44-20189, JP-A Nos. 51-82102, 52-134692, 59-138205, 60-84305, 62-18537, 64-33104, and Research Disclosure No. 33825. Specific examples include triethanolamine, ethyl p-dimethylaminobenzoate, p-formyldimethylaniline, and p-methylthiodimethylaniline.

Other examples of the co-sensitizer include thiols and sulfides such as thiol compounds described in JP-A No. 53-702, JP-B No. 55-500806, and JP-A No. 5-142772, and disulfide compounds described in JP-A No. 56-75643, and specific examples thereof include 2-mercaptobenzothiazole, 2-mercaptobenzoxazole, 2-mercaptobenzimidazole, 2-mercapto-4 (3H)-quinazoline, and β-mercaptonaphthalene.

Yet other examples of the co-sensitizer include amino acid compounds such as N-phenylglycine, organometallic compounds described in JP-B No. 48-42965, such as tributyl tin acetate, hydrogen donors described in JP-B No. 55-34414, and sulfur compounds described in JP-A No. 6-308727, such as trithiane.

The content of the co-sensitizer is preferably from 0.1 to 30% by mass, more preferably from 0.5 to 25% by mass, and even more preferably from 1 to 20% by mass with respect to the mass of the total solid content of the curable composition, from the viewpoint of improving the curing rate based on the balance of the polymerization growth rate and chain transfer.

<Polymerization Inhibitor>

In the invention, it is preferred that a small amount of a heat polymerization inhibitor be added in order to prevent unnecessary heat polymerization of the compound having a polymerizable ethylenically unsaturated double bond during manufacture or storage of the curable composition.

Examples of the heat polymerization inhibitor useful in the invention include hydroquinone, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butyl phenol), and N-nitrosophenylhydroxyamine primary cerium salt.

The addition amount of the heat polymerization inhibitor is preferably from about 0.01% to about 5% by mass with respect to the mass of the whole composition. As necessary, in order to prevent polymerization inhibition caused by oxygen, a higher fatty acid derivative such as behenic acid or behenic acid amide may be added to the composition so as to be located on the surface of the photosensitive layer during the drying step after application of the composition. The addition amount of the higher fatty acid derivative is preferably from about 0.5% to about 10% by mass with respect to the whole composition.

<Other Additives>

Further, in the invention, known additives such as an inorganic filler for improving the physical properties of the cured film, a plasticizing agent, and an oil-sensitizing agent for improving the ink adherability on the photosensitive layer surface may be added to the composition.

Examples of the plasticizing agent include dioctyl phthalate, didodecyl phthalate, triethylene glycol dicaprylate, dimethylglycol phthalate, tricresyl phosphate, dioctyl adipate, dibutyl sebacate, and triacetyl glycerin. When a binder is used, the plasticizing agent may be added in an amount of 10% by mass or less with respect to the total mass of the compound having an ethylenically unsaturated double bond and the binder.

The curable composition of the invention is cured with high sensitivity and exhibits good storage stability. In addition, the curable composition exhibits good adhesion to a hard material surface such as a substrate to be coated with the curable composition, and in the cured film, occurrence of needle crystals is suppressed and the lightness thereof is high. Accordingly, the curable composition of the invention is suitable for the uses in image forming materials for three-dimensional optical molding, holography, and color filters, as well as inks, paints, adhesives, and coating agents.

[Color Filter and Method for Producing the Same]

The color filter of the invention and the method for producing the same are described below.

The color filter of the invention includes a color pattern formed from the curable composition of the invention on a support.

The color filter of the invention is further described below with reference to the method for producing the same (the method of the invention for producing a color filter).

The method includes applying the curable composition of the invention onto a support thereby forming a curable composition layer (hereinafter may be abbreviated as "curable composition layer formation step"), pattern exposing the curable composition layer (hereinafter may be abbreviated as "exposure step"), and developing the exposed curable composition layer thereby forming a color pattern (hereinafter may be abbreviated as "development step").

The steps of the producing method of the invention are further described below.

<Curable Composition Layer Formation Step>

In the curable composition layer formation step, the curable composition of the invention is applied onto a support, thereby forming a curable composition layer.

The support used herein may be a photoelectric transducer substrate used for an image pickup device, for example, a silicon substrate or a complementary metal oxide film semiconductor (CMOS).

As necessary, the support may have thereon an undercoat layer for the purpose of improving adhesion to the upper layer, preventing diffusion of substances, or flattening the substrate surface.

The application of the curable composition of the invention onto a support may be achieved by any method such as slit coating, ink jet process, rotary coating, cast coating, roll coating, or screen printing. Of these methods, rotary coating is normally used.

The coating thickness of the curable composition is preferably from 0.1 µm to 5 µm, more preferably from 0.2 µm to 3 µm, and even more preferably from 0.2 µm to 2 µm.

Drying (prebaking) of the photocurable composition layer applied to the substrate may be carried out using a hot plate or an oven at 50° C. to 140° C. for 10 to 300 seconds.

In the curable composition layer formation step of applying the curable composition of the invention, when the curable composition adheres to, for example, the nozzle of the coating apparatus, the piping unit of the coating apparatus, the inside of the coating apparatus, or the like, the curable composition may be easily removed by using a known cleaning liquid. In this case, in order to more effectively remove the curable composition, a solvent similar to that contained in the curable composition of the invention is preferably used as the cleaning liquid.

Cleaning liquids described in JP-A Nos. 7-128867, 7-146562, 8-278637, 2000-273370, 2006-85140, 2006-291191, 2007-2101, 2007-2102, 2007-281523 and the like may also be preferably used as a cleaning liquid for cleaning and removing of the curable composition of the invention.

As the cleaning liquid, alkylene glycol monoalkyl ether carboxylate or alkylene glycol monoalkyl ether are preferably used.

As the cleaning liquid, only one solvent may be used, or two or more solvents may be mixed and used.

When two or more solvents are mixed, a mixed solvent of a solvent with a hydroxyl group and a solvent without a hydroxyl group is preferably used. The mass ratio of the solvent with a hydroxyl group to the solvent without a hydroxyl group is preferably from 1/99 to 99/1, more preferably from 10/90 to 90/10, and further preferably from 20/80 to 80/20. As the mixed solvent, a mixed solvent of propylene glycol monomethyl ether acetate (PGMEA) and propylene glycol monomethyl ether (PGME) in which the mass ratio thereof is 60/40 is particularly preferable.

In order to enhance the permeability of the cleaning liquid to the curable composition, the cleaning liquid may contain the above-described surfactant which may be contained in the curable composition.

<Exposure Step>

In the exposure step, the curable composition layer formed in the curable composition layer formation step is pattern exposed. The pattern exposure may be scanning exposure, or exposure through a mask having a specific mask pattern. From the viewpoint of achieving a high resolution, exposure through a mask pattern is preferred.

In the present step, the coated layer is pattern exposed (preferably through a specific mask pattern), thereby selectively curing the photoirradiated portion of the coated layer. In the subsequent development step, development is carried out using a developing solution, thereby forming a color pattern.

The radiation useful for the exposure is particularly preferably ultraviolet radiation such as g-line or i-line radiation. The radiation dose is preferably from 30 mJ/cm$^2$ to 1500 mJ/cm$^2$, more preferably from 50 mJ/cm$^2$ to 1000 mJ/cm$^2$, and most preferably from 80 mJ/cm$^2$ to 500 mJ/cm$^2$.

<Development Step>

Subsequently, the development step including alkali development is carried out, thereby eluting the portion unexposed to light into an alkaline aqueous solution so as to selectively leave the photocured portion.

The developing solution is preferably an organic alkaline developing solution which will not damage the circuit on the substrate. The development conditions may be established as appropriate. The development temperature is normally from 20° C. to 30° C., and the development time is from 20 seconds to 180 seconds.

Examples of the alkaline chemical used to make the developing solution include organic alkaline compounds such as ammonia water, ethylamine, diethylamine, dimethylethanolamine, tetramethylammonium hydroxide, tetraethyl ammonium hydroxide, choline, pyrrole, piperidine, and 1,8-diazabicyclo-[5,4,0]-7-undecene. The alkaline chemical is diluted with pure water to a concentration of 0.001 to 10% by mass, preferably 0.01 to 1% by mass to make an aqueous alkaline solution, and the solution is suitable as the developing solution. When the aqueous alkaline solution is used as the developing solution, the solution is rinsed with pure water after development.

Subsequently, the coated layer is washed to remove excessive portions of the developing solution, dried, and then subjected to heat treatment (postbaking). The above-described steps are carried out for the respective colors, thus producing cured films. As a result of this, a color filter is obtained.

The postbaking is heat treatment carried out after development for achieving complete curing, and the heat curing treatment is carried out normally at 100° C. to 240° C. When the substrate is a glass or silicon substrate, the temperature is more preferably from 200° C. to 240° C.

The postbaking treatment for the coated layer after development may be carry out in a continuous or batch manner under the above-described conditions using a heating unit such as a hot plate, a convection oven (hot air circulating dryer), or a high-frequency heater.

In the producing method of the invention, after the curable composition layer formation step, exposure step and development step, a curing step for curing the formed color patterns through heating and/or light exposure may be further carried out.

The above-described curable composition layer formation step, exposure step, and development step (and as necessary a curing step) are repeatedly carried out for desired number of hues (for example, three or four colors) to make color patterns, thereby making a color filter of a desired hue.

The color filter of the invention is formed using the colored curable composition of the invention, so that the formed color pattern gives good adhesion to the supporting substrate, high exposure sensitivity, and good adhesion to the substrate in the exposed areas. In addition, formation of needle crystals is suppressed in the cured film in spite of the use of a polyhalogenated zinc phthalocyanine pigment as a coloring agent. As a result, a pattern with high resolution and high chroma may be formed. Accordingly, the color filter is suitable for a solid-state image pickup device such as a CCD, and particularly suitable for a CCD element and a CMOS with high resolution exceeding 1,000,000 pixels. The color filter of the invention is useful as, for example, a color filter for a CCD, wherein the color filter is disposed between the light receiving portion of each pixel and the microlense for gathering light.

According to the invention, for example, the following embodiments <1> to <10> are provided.

<1> A colored curable composition for a solid-state image pickup device, comprising a polyhalogenated zinc phthalocyanine pigment, a photopolymerization initiator, a polymerizable compound, and an epoxy compound.

<2> The colored curable composition for a solid-state image pickup device of <1>, wherein the polymerizable compound contains an ethylene oxide or propylene oxide structure.

<3> The colored curable composition for a solid-state image pickup device of <1> or <2>, wherein the content of the epoxy compound is from 1.0% by mass to 15.0% by mass in terms of the solid content.

<4> The colored curable composition for a solid-state image pickup device of any one of <1> to <3>, wherein the epoxy compound is a polyfunctional epoxy resin containing from 10 to 50 epoxy groups in a molecule thereof <5> A color filter for a solid-state image pickup device, comprising, on a support, a color pattern formed from the colored curable composition for a solid-state image pickup device of any one of <1> to <4>.

<6> A method for producing a color filter for a solid-state image pickup device, comprising applying the colored curable composition for a solid-state image pickup device of any one of <1> to <4> onto a support thereby forming a colored curable composition layer, pattern exposing the colored curable composition layer, and developing the exposed colored curable composition layer thereby forming a color pattern.

<7> The colored curable composition for a solid-state image pickup device, wherein the photopolymerization initiator is an oxime photopolymerization initiator.

<8> The colored curable composition for a solid-state image pickup device, wherein the oxime photopolymerization initiator is a compound represented by the formula (I):

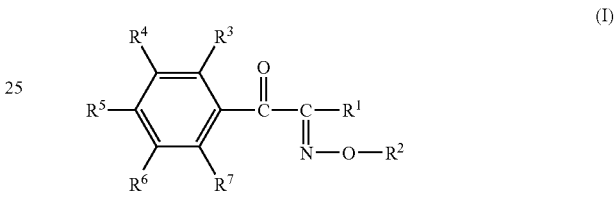

wherein $R^1$ represents an optionally substituted alkyl or aryl group; $R^2$ represents an optionally substituted acyl group, an optionally substituted alkyl group, an optionally substituted aryl group, an optionally substituted alkenyl group, or an optionally substituted alkynyl group; $R^3$, $R^4$, $R^5$, $R^6$, and $R^7$ each independently represent a hydrogen atom or a monovalent organic group; $R^3$, $R^4$, $R^5$, $R^6$, and $R^7$ may be bonded to each other to form a five- or six-membered ring.

<9> The colored curable composition for a solid-state image pickup device, which contains, as coloring agents, the polyhalogenated zinc phthalocyanine pigment and C. I. Pigment Yellow 139.

<10> The colored curable composition for a solid-state image pickup device, wherein the content ratio of the polyhalogenated zinc phthalocyanine to C. I. Pigment Yellow 139 is from 100/50 to 100/60.

Accordingly, the invention provides a colored curable composition for a solid-state image pickup device which allows the formation of a cured film having high chroma and the prevention of the precipitation of needle crystals in the cured film, in spite of the inclusion of a polyhalogenated zinc phthalocyanine as a coloring agent. The invention also provides a color filter for a solid-state image pickup device, including a green color pattern having high chroma, and a method for producing the color filter at a high productivity.

EXAMPLES

The invention is further illustrated below with reference to examples, but the invention will not be limited to these examples unless departing from the scope of the invention. Unless otherwise noted, "part(s)" is expressed in terms of mass.

Example 1

1-1. Preparation of Green Pigment Dispersion Liquid

—Preparation of green pigment dispersion liquid P1—

A mixed liquid containing 12.6 parts of a pigment mixture of C. I. Pigment Green 58 and C. I. Pigment Yellow 139 (mixed in a mass ratio of 100/55), 5.2 parts of a dispersant DISPERBYK 2001 (trade name, manufactured by BYK-Chemie (BYK), solid content 45.1% by mass), 2.7 parts of a dispersing resin P-1, and 78.3 parts of propylene glycol monomethyl ether acetate as a solvent was stirred and dispersed in a bead mill for 15 hours, thereby preparing a green pigment dispersion liquid.

1-2. Preparation of Red Pigment Dispersion Liquid

—Preparation of Red Pigment Dispersion Liquid P2—

A mixed liquid containing 12.1 parts of a pigment mixture of C. I. Pigment Red 254 and C. I. Pigment Yellow 139 (mixed in a mass ratio of 100/45), 10.4 parts of a dispersant DISPERBYK 2001 (trade name, manufactured by BYK-Chemie (BYK), solid content 45.1% by mass), 3.8 parts of a dispersing resin P-2, and 73.7 parts of propylene glycol monomethyl ether acetate as a solvent was stirred and dispersed in a bead mill for 15 hours, thereby preparing a red pigment dispersion liquid.

1-3. Preparation of Blue Pigment Dispersion Liquid

—Preparation of Blue Pigment Dispersion Liquid P3—

A mixed liquid containing 14 parts of a pigment mixture of C. I. Pigment Blue 15:6 and C. I. Pigment Violet 23 (mixed in a mass ratio of 100/25), 4.7 parts of a dispersant DISPERBYK 2001 (trade name, manufactured by BYK-Chemie (BYK), solid content 45.1% by mass), 3.5 parts of a dispersing resin P-2, and 77.8 parts of propylene glycol monomethyl ether acetate as a solvent was stirred and dispersed in a bead mill for 15 hours, thereby preparing a blue pigment dispersion liquid.

1-4. Preparation of Green Colored Curable Composition (Coating Liquid) A-1

The green pigment dispersion liquid obtained above was mixed in the following composition, and the mixture was stirred to prepare a green colored curable composition A-1.
<Composition>

| | |
|---|---|
| Green pigment dispersion liquid | 83.3 parts |
| Alkali soluble resin: P-1 | 1.0 parts |
| OXE-01 (manufactured by Ciba Specialty Chemicals; photopolymerization initiator) | 1.2 parts |
| Monomer 1: compound M-1 | 1.4 parts |
| Monomer 2: M-305 (manufactured by Toagosei Co., Ltd.) | 1.4 parts |
| Epoxy resin: EHPE3150 (manufactured by Daicel Chemical Industries, Ltd.) [epoxy compound containing about 15 epoxy groups in the molecule thereof] | 1.05 parts |
| P-methoxyphenol | 0.001 parts |
| Polyethylene glycol methyl ether acetate [hereinafter abbreviated as PGMEA; solvent] | 7.4 parts |
| Surfactant (trade name: F-781, 0.2% PGMEA solution manufactured by Dainippon Ink And Chemicals, Incorporated) | 4.2 parts |

1-5. Preparation of Red Colored Curable Composition (Coating Liquid) B-1

The red pigment dispersion liquid obtained above was mixed in the following composition, and the mixture was stirred to prepare a red colored curable composition B-1.
<Composition>

| | |
|---|---|
| Red pigment dispersion liquid | 59.6 parts |
| Alkali soluble resin: P-1 | 1.2 parts |
| OXE-02 (manufactured by Ciba Specialty Chemicals; photopolymerization initiator) | 0.7 parts |
| Monomer 1: compound M-1 | 1.6 parts |
| Monomer 2: SR-494 (manufactured by Sartomer Company, Inc.) | 1.6 parts |
| P-methoxyphenol | 0.002 parts |
| PGMEA (solvent) | 31 parts |
| Surfactant (trade name: F-781, 0.2% PGMEA solution manufactured by Dainippon Ink And Chemicals, Incorporated) | 4.2 parts |

1-6. Preparation of Blue Colored Curable Composition (Coating Liquid) C-1

The blue pigment dispersion liquid obtained above was mixed in the following composition, and the mixture was stirred to prepare a blue colored curable composition C-1.
<Composition>

| | |
|---|---|
| Blue pigment dispersion liquid | 50.6 parts |
| Alkali soluble resin: P-1 | 2.1 parts |
| OXE-01 (manufactured by Ciba Specialty Chemicals; photopolymerization initiator) | 1.2 parts |
| Monomer 1: compound M-1 | 3.5 parts |
| Monomer 2: SR-494 (manufactured by Sartomer Company, Inc.) | 1.2 parts |
| P-methoxyphenol | 0.002 parts |
| PGMEA (solvent) | 36 parts |
| Surfactant (trade name: F-781, 0.2% PGMEA solution manufactured by Dainippon Ink And Chemicals, Incorporated) | 4.2 parts |

1-7. Formation of Color Patterns

The green colored curable composition A-1 prepared as described above was applied onto an 8-inch silicon wafer, on which hexamethyldisilazane had been sprayed in advance, thereby forming a photocurable coated layer. The coated layer was subjected to heat treatment (prebaking) on a hot plate at 100° C. for 180 seconds to give a dry film thickness of 1.0 μm. Subsequently, using an i-line stepper exposure equipment FPA-3000i5+ (manufactured by Canon Inc.), the coated layer was exposed to light having a wavelength of 365 nm through a 1.0-μm-square bayer pattern mask at a radiation dose of 50 to 1000 mJ/cm$^2$ (the exposure dose was changed by 50 mJ/cm$^2$). Thereafter, the silicon wafer having the irradiated coated layer was mounted on a horizontal rotary table of a spin shower developing machine (trade name: DW-30, manufactured by Chemitronics Co.), and subjected to puddle development at 23° C. for 180 seconds using a 40% diluted solution of CD-2000 (manufactured by Fujifilm Electronic Materials Co., Ltd.), thereby forming a green color pattern on the silicon wafer.

The silicon wafer having the green color pattern was fixed on the horizontal rotary table using a vacuum chuck, and rinsed by a shower of pure water fed from a jet nozzle above the center of rotation with the silicon wafer being rotated by a rotator at a rotation speed of 50 rpm, followed by spray drying.

Thereafter, the wafer was heated for 5 minutes on a hot plate at 200° C., thus obtaining a color filter having a pattern.

The same steps as those of the green pattern formation were carried out using each of the red colored curable composition B-1 and the blue colored curable composition C-1, except that the coated layer was exposed to light through a 1.0-µm-square island pattern mask, thus forming a color filter having red (R), green (G), and blue (B) patterns.

1-8. Evaluation (1-8-1. Presence or Absence of Needle Crystals)

The color filter obtained by the above-described procedure was heated on a hot plate at 260° C. for 5 minutes, the patterns were observed using a scanning electron microscope (SEM) under 20,000 magnification, and the degree of occurrence of needle matter was evaluated according to the following criteria.

<Evaluation Criteria>
A: no occurrence of needle matter
B: negligible occurrence of minute needle matter
C: acceptable occurrence of needle matter
X: unacceptable occurrence of needle matter composition is not satisfactory but acceptable. If the variation is more than ±2.0 mPa, the composition is unacceptable.

(1-8-3. Evaluation of Y Value (Brightness))

A color cured film was formed on the whole surface of a glass substrate using the colored curable composition in the same manner as the above procedure, except that the coated layer was wholly exposed to light with no mask.

The substrate having the color cured film after postbaking was measured by a spectrophotometer (trade name: MCPD3000, manufactured by Otsuka Electronics Co., Ltd.) to obtain the brightness Y value.

Another color cured film was formed and measured in the same manner, except that the colored curable composition was prepared using Pigment Green 36 in place of Pigment Green 58; the brightness (Y value) was 55.4, which was inferior to that of the color cured film formed using Pigment Green 58.

Examples 2 to 11 and 14 to 19, Comparative Example 1

Evaluations were made in the same manner as in Example 1, except that the type and proportion of pigments used for the preparation of pigment dispersion liquids, the type and amount of the epoxy compound, the type of the initiator, and the proportions of these components were changed as listed in Table 1. The addition amount change of the epoxy resin was adjusted by changing the addition amount of the alkali soluble resin. The evaluation results are shown in Table 1.

TABLE 1

| | Yellow pigment | | Epoxy compound | | | | | Evaluation results | | |
|---|---|---|---|---|---|---|---|---|---|---|
| | Pigment name | Ratio of Pigment Green 58 thereto | Compound | Average number of functional groups | Content | Photopoly-merization initiator | Poly-merizable compound | Alkali soluble resin | Needle matter | Viscosity change over time | Y value |
| Example 1 | Pigment Yellow 139 | 100/55 | EHPE-3150 | About 15 | 5.0% | OXE-01 | M-1/M-305 | P-1 | A | +0.3 | 61.1 |
| Example 2 | Pigment Yellow 139 | 100/55 | EHPE-3150 | About 15 | 0.9% | OXE-01 | M-1/M-305 | P-1 | C | +0.3 | 61.1 |
| Example 3 | Pigment Yellow 139 | 100/55 | EHPE-3150 | About 15 | 1.0% | OXE-01 | M-1/M-305 | P-1 | B | +0.3 | 61.1 |
| Example 4 | Pigment Yellow 139 | 100/55 | EHPE-3150 | About 15 | 15.0% | OXE-01 | M-1/M-305 | P-1 | A | +1.0 | 61.1 |
| Example 5 | Pigment Yellow 139 | 100/55 | EHPE-3150 | About 15 | 15.1% | OXE-01 | M-1/M-305 | P-1 | A | +1.2 | 61.1 |
| Example 6 | Pigment Yellow 139 | 100/55 | EHPE-3150 | About 15 | 5.0% | IRGACURE 369 | M-1/M-305 | P-1 | C | +0.4 | 61.1 |
| Example 7 | Pigment Yellow 139 | 100/55 | EHPE-3150 | About 15 | 5.0% | I-1 | M-1/M-305 | P-1 | B | +0.4 | 61.1 |
| Example 8 | Pigment Yellow 139 | 100/55 | E-1 | 2 | 5.0% | OXE-01 | M-1/M-305 | P-1 | C | +0.2 | 61.1 |
| Example 9 | Pigment Yellow 139 | 100/55 | E-2 | 4 | 5.0% | OXE-01 | M-1/M-305 | P-1 | C | +0.3 | 61.1 |
| Example 10 | Pigment Yellow 139 | 100/55 | E-3 | About 9 | 5.0% | OXE-01 | M-1/M-305 | P-1 | B | +0.5 | 61.1 |
| Example 11 | Pigment Yellow 139 | 100/55 | E-4 | About 10 | 5.0% | OXE-01 | M-1/M-305 | P-1 | A | +0.7 | 61.1 |
| Example 14 | Pigment Yellow 139 | 100/49 | EHPE-3150 | About 15 | 5.0% | OXE-01 | M-1/M-305 | P-1 | B | +1.2 | 61.2 |
| Example 15 | Pigment Yellow 139 | 100/50 | EHPE-3150 | About 15 | 5.0% | OXE-01 | M-1/M-305 | P-1 | A | +0.5 | 61.2 |
| Example 16 | Pigment Yellow 139 | 100/60 | EHPE-3150 | About 15 | 5.0% | OXE-01 | M-1/M-305 | P-1 | A | +0.6 | 61.1 |
| Example 17 | Pigment Yellow 139 | 100/61 | EHPE-3150 | About 15 | 5.0% | OXE-01 | M-1/M-305 | P-1 | B | +1.1 | 61.1 |
| Example 18 | Pigment Yellow 139 | 100/50 | EHPE-3150 | About 15 | 5.0% | OXE-01 | M-1/M-305 | P-6 | B | +0.4 | 61.1 |
| Example 19 | Pigment Yellow 139 | 100/55 | EHPE-3150 | About 15 | 5.0% | OXE-01 | DPHA/M-305 | P-1 | C | +0.2 | 61.1 |
| Comparative Example 1 | Pigment Yellow 139 | 100/55 | None | — | — | OXE-01 | M-1/M-305 | P-1 | X | +0.3 | 61.1 |

(1-8-2. Evaluation of Stability Over Time of Colored Curable Composition)

The colored curable composition A-1 used for the formation of the color pattern of the color filter was stored at 7° C. for 6 months, and the change of viscosity before and after the storage was observed. If the difference is within ±1.0 mPa, the composition is practically acceptable. If within ±2.0 mPa, the The alkali soluble resin (P-1) used for the preparation of the above-described colored curable compositions is the exemplary polymer compound (P-1), and the structures of the alkali soluble resin (P-6), polymerizable compound (M-1), (M-305) and DPHA (KARAYAD DPHA, manufactured by Nippon Kayaku Co., Ltd.), oxime photoinitiators (I-1) and (OXE-01), α-aminoketone photoinitiator IRGACURE 369, and epoxy compounds (E-1) to (E-4) and EHPE-3150 are shown below. Table 1 includes the number of epoxy groups contained in the molecule of the epoxy compound as "Average number of functional groups".
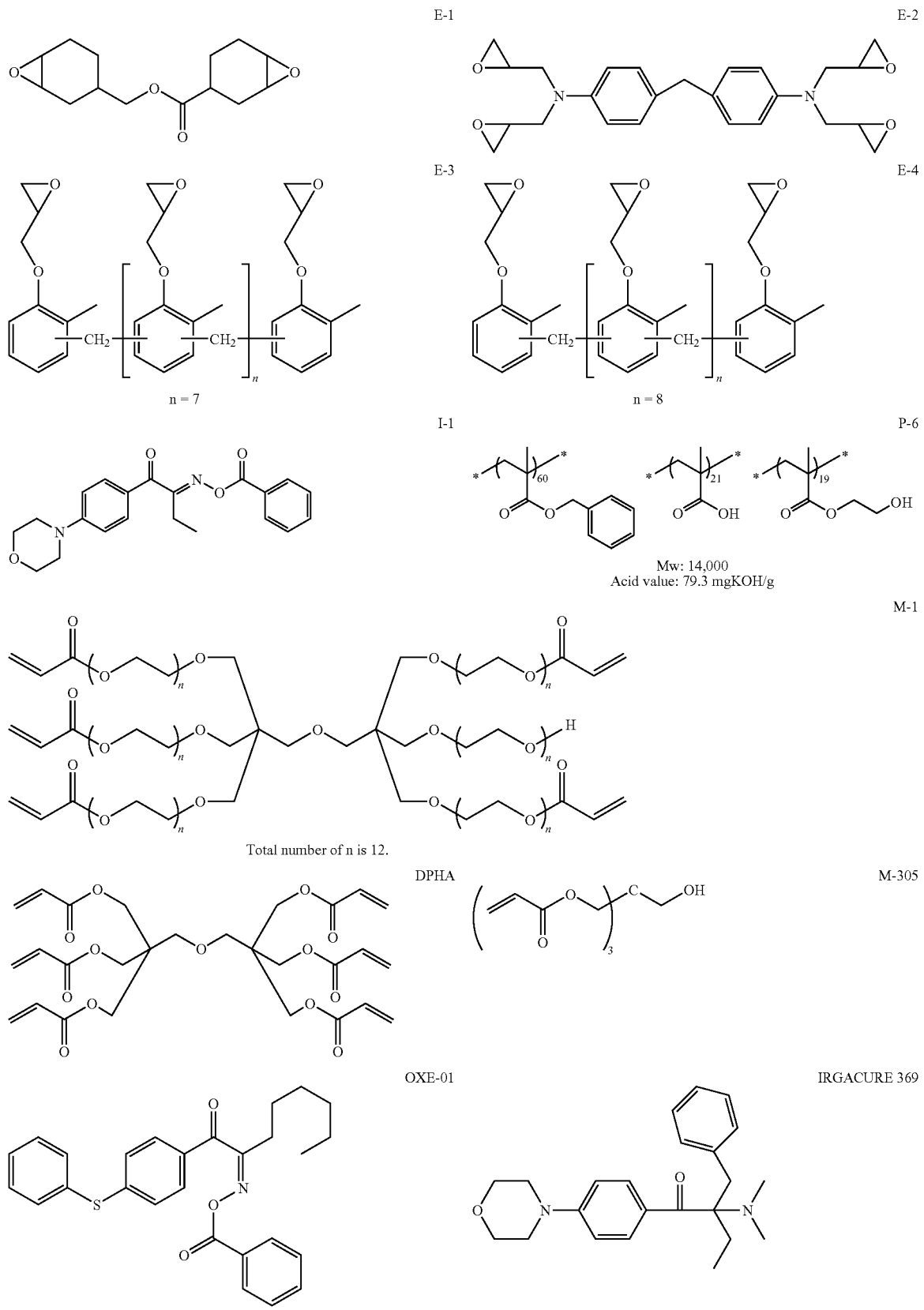

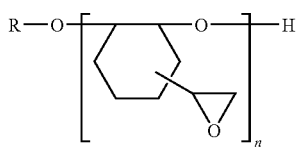

EHPE-3150

As is evident from Table 1, in spite of the inclusion of a polyhalogenated zinc phthalocyanine pigment, the colored curable composition of the invention allows the formation of a green cured film pattern having high chroma and the prevention of the occurrence of needle matter. The comparison of Examples 1 and 11 with Examples 8 to 10 indicates that the invention is particularly advantageous when the epoxy compound has 10 or more epoxy groups in the molecule thereof.

Example 20

Making of Solid-State Image Pickup Device

As described in the following example, using the method of the invention for producing a color filter, a solid-state image pickup device was made using the colored curable composition for a solid-state image pickup device.

2-1. Preparation of Resist Liquid

The following composition were mixed and dissolved to prepare a resist liquid.

<Resist Liquid Composition>

| | |
|---|---|
| Solvent: propylene glycol monomethyl ether acetate | 19.20 parts |
| Solvent: ethyl lactate | 36.67 parts |
| Alkali soluble resin: 40% PGMEA solution of benzyl methacrylate/methacrylic acid/2-hydroxyethyl methacrylate copolymer (molar ratio: 60/22/18, weight average molecular weight: 15,000) | 30.51 parts |
| Compound containing an ethylenically unsaturated double bond: dipentaerythritol hexaacrylate | 12.20 parts |
| Polymerization inhibitor: p-methoxyphenol | 0.0061 parts |
| Fluorine surfactant: F-475, manufactured by Dainippon Ink And Chemicals, Incorporated | 0.83 parts |
| Photopolymerization initiator: trihalomethyltriazine photopolymerization initiator (trade name: TAZ-107, manufactured by Midori Kagaku Co., Ltd.) | 0.586 parts |

2-2. Making of Silicon Substrate Having Undercoat Layer

A 6-inch silicon wafer was heated for 30 minutes in an oven at 200° C. Subsequently, the resist liquid was applied onto the silicon wafer to give a dry film thickness of 1.5 μm, and dried for 1 hour under heating in an oven at 220° C. to form an undercoat layer, thus obtaining a silicon wafer substrate having an undercoat layer.

2-3. Formation of Color Filter

The green, red, and blue colored curable compositions A-1, B-1, and C-1 were applied to the silicon wafer substrate having an undercoat layer, and subjected to exposure and development in the same manner as in Example 1, thus forming a color filter with red (R), green (G), and blue (B) patterns.

2-4. Formation and Evaluation of Solid-State Image Pickup Device

The color filter obtained by the above producing method of the invention was incorporated into a solid-state image pickup device according to a known method. When an image was captured by the solid-state image pickup device including the color filter of the invention, it was found that the image was good.

All publications, patent applications, and technical standards mentioned in this specification are herein incorporated by reference to the same extent as if each individual publication, patent application, or technical standard was specifically and individually indicated to be incorporated by reference.

What is claimed is:

1. A colored curable composition for a solid-state image pickup device, comprising a polyhalogenated zinc phthalocyanine pigment, a yellow pigment, a photopolymerization initiator, a polymerizable compound, an epoxy compound, and a resin comprising a structural unit represented by the following formula (1), (2) or (3):

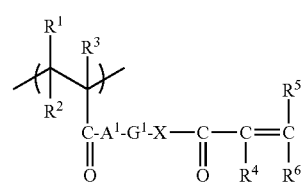

Formula (1)

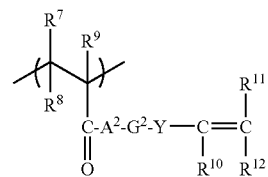

Formula (2)

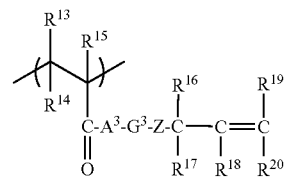

Formula (3)

wherein $A^1$, $A^2$, and $A^3$ each independently represent an oxygen atom, a sulfur atom, or —N($R^{21}$)—, and $R^{21}$ represents an optionally substituted alkyl group; $G^1$, $G^2$, and $G^3$ each independently represent a divalent organic group; X and Z each independently represent an oxygen atom, a sulfur atom, or —N($R^{22}$)—, and $R^{22}$ represents an optionally substituted alkyl group; Y represents an oxygen atom, a sulfur atom, an optionally substituted phenylene group, or —N($R^{23}$)—, and $R^{23}$ represents an optionally substituted alkyl group; and $R^1$ to $R^{20}$ each independently represent a monovalent substituent group, and wherein a mass ratio of the polyhalogenated zinc phthalocyanine pigment to the yellow pigment is from 100/50 to 100/60.

2. The colored curable composition for a solid-state image pickup device of claim 1, wherein the polymerizable compound contains an ethylene oxide or propylene oxide structure.

3. The colored curable composition for a solid-state image pickup device of claim 1, wherein the content of the epoxy compound is from 1.0% by mass to 15.0% by mass in terms of the solid content.

4. The colored curable composition for a solid-state image pickup device of claim 1, wherein the epoxy compound is a polyfunctional epoxy resin containing from 10 to 50 epoxy groups in a molecule thereof.

5. A color filter for a solid-state image pickup device, comprising, on a support, a color pattern formed from the colored curable composition for a solid-state image pickup device of claim 1.

6. A solid-state image pickup device comprising the color filter of claim 5.

7. A method for producing a color filter for a solid-state image pickup device, comprising applying the colored curable composition for a solid-state image pickup device of claim 1 onto a support thereby forming a colored curable composition layer, pattern exposing the colored curable composition layer, and developing the exposed colored curable composition layer thereby forming a color pattern.

8. The colored curable composition for a solid-state image pickup device of claim 1, wherein the resin has an acid value of from 5 to 200 mgKOH/g.

9. The colored curable composition for a solid-state image pickup device of claim 1, wherein the photopolymerization initiator is an oxime compound represented by the following formula (I):

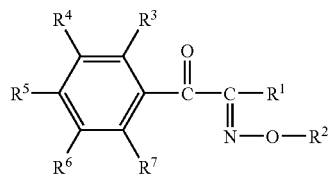

(I)

wherein $R^1$ represents an optionally substituted alkyl or aryl group; $R^2$ represents an optionally substituted acyl group, an optionally substituted alkyl group, an optionally substituted aryl group, an optionally substituted alkenyl group, or an optionally substituted alkynyl group; $R^3$, $R^4$, $R^5$, $R^6$, and $R^7$ each independently represent a hydrogen atom or a monovalent organic group; and $R^3$, $R^4$, $R^5$, $R^6$, and $R^7$ may be bonded to each other to form a five- or six-membered ring.

10. The colored curable composition for a solid-state image pickup device of claim 1, wherein the yellow pigment is C. I. Pigment Yellow 139.

11. The colored curable composition for a solid-state image pickup device of claim 1, wherein the polymerizable compound comprises a compound obtained by addition of ethylene oxide or propylene oxide to a polyfunctional alcohol followed by (meth)acrylation.

12. The colored curable composition for a solid-state image pickup device of claim 1, wherein the polymerizable compound comprises a compound represented by the following formula M-1:

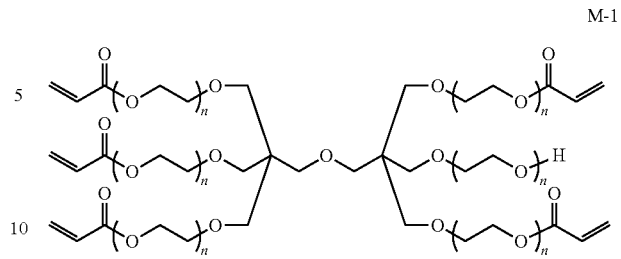

M-1 wherein a total number of n is 12.

13. The colored curable composition for a solid-state image pickup device of claim 1, wherein the photopolymerization initiator is a compound represented by the following formula:

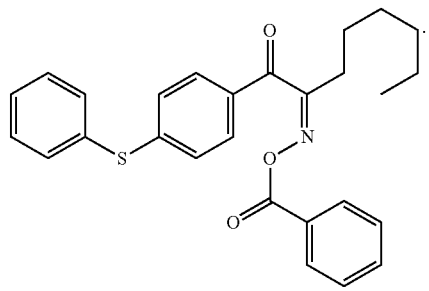 [SMILES: CCCCCC/C(=N/OC(=O)c1ccccc1)C(=O)c1ccc(Sc2ccccc2)cc1]

14. A colored curable composition for a solid-state image pickup device, comprising a polyhalogenated zinc phthalocyanine pigment, a photopolymerization initiator, a polymerizable compound, an epoxy compound, and a resin comprising a structural unit represented by the following formula (1), (2) or (3):

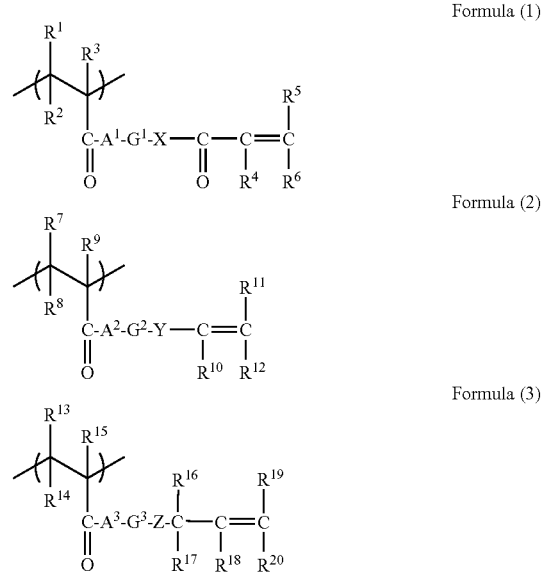

Formula (1)

Formula (2)

Formula (3)

wherein $A^1$, $A^2$, and $A^3$ each independently represent an oxygen atom, a sulfur atom, or —N($R^{21}$)—, and $R^{21}$ represents an optionally substituted alkyl group; $G^1$, $G^2$, and $G^3$ each independently represent a divalent organic group; X and Z each independently represent an oxygen atom, a sulfur atom, or —N(R$^{22}$)—, and R$^{22}$ represents an optionally substituted alkyl group; Y represents an oxygen atom, a sulfur atom, an optionally substituted phenylene group, or —N(R$^{23}$)—, and R$^{23}$ represents an optionally substituted alkyl group; and R$^1$ to R$^{20}$ each independently represent a monovalent substituent group, wherein the polymerizable compound comprises a compound represented by the following formula M-1:

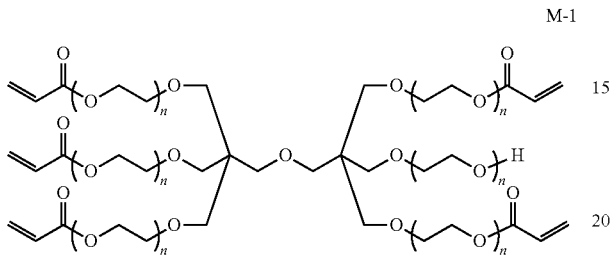

M-1 wherein a total number of n is 12.

15. The colored curable composition for a solid-state image pickup device of claim 14, wherein the content of the epoxy compound is from 1.0% by mass to 15.0% by mass in terms of the solid content.

16. A color filter for a solid-state image pickup device, comprising, on a support, a color pattern formed from the colored curable composition for a solid-state image pickup device of claim 14.

17. A solid-state image pickup device comprising the color filter of claim 16.

18. A method for producing a color filter for a solid-state image pickup device, comprising applying the colored curable composition for a solid-state image pickup device of claim 14 onto a support thereby forming a colored curable composition layer, pattern exposing the colored curable composition layer, and developing the exposed colored curable composition layer thereby forming a color pattern.

19. The colored curable composition for a solid-state image pickup device of claim 14, wherein the photopolymerization initiator is an oxime compound represented by the following formula (I):

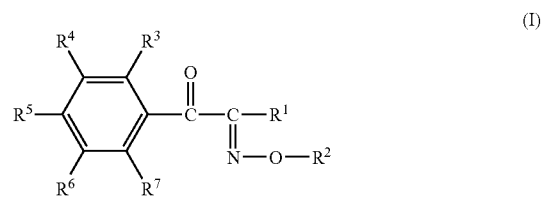

(I)

wherein R$^1$ represents an optionally substituted alkyl or aryl group; R$^2$ represents an optionally substituted acyl group, an optionally substituted alkyl group, an optionally substituted aryl group, an optionally substituted alkenyl group, or an optionally substituted alkynyl group; R$^3$, R$^4$, R$^5$, R$^6$, and R$^7$ each independently represent a hydrogen atom or a monovalent organic group; and R$^3$, R$^4$, R$^5$, R$^6$, and R$^7$ may be bonded to each other to form a five- or six-membered ring.

20. The colored curable composition for a solid-state image pickup device of claim 14, further comprising C. I. Pigment Yellow 139.

* * * * *